United States Patent
Kinjo

(10) Patent No.: US 7,760,263 B2
(45) Date of Patent: Jul. 20, 2010

(54) IMAGE PHOTOGRAPHING/REPRODUCING SYSTEM AND METHOD, PHOTOGRAPHING APPARATUS AND IMAGE REPRODUCING APPARATUS USED IN THE IMAGE PHOTOGRAPHING/REPRODUCING SYSTEM AND METHOD AS WELL AS IMAGE REPRODUCING METHOD

(75) Inventor: Naoto Kinjo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1014 days.

(21) Appl. No.: 11/390,283

(22) Filed: Mar. 28, 2006

(65) Prior Publication Data

US 2006/0176388 A1 Aug. 10, 2006

Related U.S. Application Data

(62) Division of application No. 09/809,265, filed on Mar. 16, 2001, now Pat. No. 7,075,572.

(30) Foreign Application Priority Data

Mar. 16, 2000 (JP) ............................. 2000-073735
Apr. 14, 2000 (JP) ............................. 2000-114066

(51) Int. Cl.
*H04N 5/225* (2006.01)
(52) U.S. Cl. ................................. 348/333.12
(58) Field of Classification Search ............ 348/333.01, 348/333.12
See application file for complete search history.

(56) References Cited

U.S. PATENT DOCUMENTS

| 4,974,096 | A |   | 11/1990 | Wash |
|---|---|---|---|---|
| 5,083,155 | A |   | 1/1992 | Kataoka et al. |
| 5,142,310 | A |   | 8/1992 | Taniguchi et al. |
| 5,576,838 | A |   | 11/1996 | Renie |
| 5,903,309 | A | * | 5/1999 | Anderson ............... 348/333.02 |
| 6,147,703 | A | * | 11/2000 | Miller et al. ............. 348/220.1 |

(Continued)

FOREIGN PATENT DOCUMENTS

JP 08-43956 A 2/1996

(Continued)

OTHER PUBLICATIONS

Japanese Patent Office Action dated Aug. 3, 2009.

*Primary Examiner*—Tuan Ho
(74) *Attorney, Agent, or Firm*—Sughrue Mion, PLLC

(57) ABSTRACT

The image photographing/reproducing system includes an photographing apparatus for photographing an image, first communication unit for transmitting and receiving information to and from second communication unit at a communication point installed in a predetermined region, information recording unit for recording at least one information of photographed frame information or photographed time information and first identification information of an image recording medium, and second identification information of the communication point, at least one information being transmitted and received between the first and second communication units and an image reproducing apparatus including photographed image acquiring unit, information acquiring unit for acquiring at least one information, data acquiring unit for determining a photographed place based on the second identification information and acquiring a predetermined image or document as composite data, image reproducing unit for reproducing the photographed image and data recording unit for recording the composite data in association with the reproduced image.

4 Claims, 7 Drawing Sheets

U.S. PATENT DOCUMENTS

| | | | |
|---|---|---|---|
| 6,222,513 B1 | 4/2001 | Howard et al. | |
| 6,321,040 B1 | 11/2001 | Wess et al. | |
| 6,510,325 B1 * | 1/2003 | Mack et al. | 455/575.2 |
| 6,771,896 B2 | 8/2004 | Tamura et al. | |
| 7,196,727 B2 * | 3/2007 | Sato | 348/333.11 |

FOREIGN PATENT DOCUMENTS

| | | |
|---|---|---|
| JP | 09065268 A | 3/1997 |
| JP | 9-504928 A | 5/1997 |
| JP | 09-203956 A | 8/1997 |
| JP | 11-316397 A | 11/1999 |

* cited by examiner

THEME AREA A

72c

THEME AREA B

72c

IMAGE PHOTOGRAPHING/REPRODUCING SYSTEM AND METHOD, PHOTOGRAPHING APPARATUS AND IMAGE REPRODUCING APPARATUS USED IN THE IMAGE PHOTOGRAPHING/REPRODUCING SYSTEM AND METHOD AS WELL AS IMAGE REPRODUCING METHOD

This is a divisional of application Ser. No. 09/809,265 filed Mar. 16, 2001 now U.S. Pat. No. 7,075,572. The entire disclosure of the prior application, application Ser. No. 09/809,265 is hereby incorporated by reference.

BACKGROUND OF THE INVENTION

1. Field of the Invention

The present invention relates to an image photographing/reproducing system and method, to a photographing apparatus and an image reproducing apparatus as well as an image reproducing method used in the above system and method.

Further, the present invention relates to a photographing apparatus such as a camera with a display screen, and the like.

More specifically, the present invention relates to an image photographing/reproducing system and method for transmitting various kinds of information between communication points such as gates and the like in predetermined regions such as parks, sightseeing spots, sports arenas, baseball grounds, amusement places, amusement parks, theme parks, and the like and a camera having a photographic film loaded thereon and capable of communicating with the communication points, a lens-fitted photographic film package capable of communicating with the communication points, and a camera corresponding to a card capable of communicating with the communication points and for creating reproduced images as prints and the like making use of photographed information recorded in the film, the lens-fitted photographic film package, the card, a database corresponding to a film, a center computer, and the like, and to a photographing apparatus and an image reproducing apparatus as well as an image reproducing method used in the image photographing/reproducing system and method.

Further, the present invention relates to a photographing apparatus such as a camera with a display screen, and the like in which a sheet-like image display device such as an electronic paper and the like is applied to an image display section.

2. Description of the Related Art

Lens-fitted photographic film packages, which have a photograph film previously loaded, when the package is manufactured, on a main body provided with a simple shutter mechanism, a simple film winding mechanism and the like, have been developed and put on sale as a simplified camera. Among them, there is known a lens-fitted photographic film package arranged such that a photographed date and time storing unit, which is composed of a watch subunit, a controller, and an IC memory, is provided with a unit main body (housing) of the package, a date and time signal is recorded in a storing region, which corresponds to a photographed frame, of the IC memory each time a shutter is released, and when prints are created on the completion of photographing, the date and time data stored in the IC memory is read out and converted into numerals and printed optically or using a printer on photographic papers together with images.

For example, Japanese Unexamined Patent Application Publication No. 8-43956 discloses a lens-fitted photographic film package in which photographed information is stored therein so that it is reproduced and used in a laboratory when prints are created.

Further, Japanese Unexamined Patent Application Publication No. 9-203956 discloses a camera with a data recording function. The camera is arranged such that an IC memory is assembled in a cartridge main body or a camera main body as well as an interface terminal, which permits the IC memory to be accessed externally of the camera main body, is disposed so as to expose to the outside of the camera main body; then, photographed data of each photographed frame, which can be acquired from a camera each time an image is photographed, is stored in the IC memory as well as predetermined data is recorded in the IC memory from the outside of the camera main body through the above interface terminal.

In contrast, at present, as personal computers come into widespread use, digital still cameras for reading the image data of an image photoelectrically making use of an image pickup device such as a CCD device and the like have come into wide use.

In general, in the digital still camera, since a liquid crystal display monitor, which displays an image to be photographed, is disposed on the back surface of the camera (surface on a photographer side), the photographer can confirm a position where a main subject is located in the image to be photographed (monitor image), a composition of the main subject, and the like only looking at the liquid crystal display monitor without looking through a finder. In addition to the above, the digital still camera can display an image having been photographed as well as display a plurality of images having been photographed as index images by reducing the size of them. Further, the digital still camera permits the photographer to set various parameters by displaying a parameter setting operation screen, through which the parameters are set, on the liquid crystal display monitor.

However, since the liquid crystal display monitor consumes a large amount of power because it displays an image by liquid crystal, the monitor is limited in size with a small display screen. Thus, the liquid crystal monitor has such a problem that it cannot sufficiently exhibit its function for permitting the photographer to sufficiently confirm an image to be photographed on the monitor and for sufficiently displaying an operation setting screen.

When various parameters are set using the parameter setting screen of the digital still camera, a hierarchical structure of the operation setting screen is deepened because the size of the liquid crystal monitor is limited, and an operation setting job tends to become time-consuming. When an image having been photographed is displayed on the liquid crystal display monitor for confirmation, a long time is necessary to display the image and the photographer is often made uncomfortable thereby.

Further, when the photographer takes a picture by setting the digital still camera at a low or high position, he or she must maintain an unnatural attitude at a low or high position in accordance with the position of the camera because the liquid crystal display monitor is disposed on the back surface of the digital still camera. Thus, it is often difficult for the photographer to confirm a position of a subject to be photographed and a composition of an image through the liquid crystal display monitor.

Furthermore, when the photographer takes a picture of himself or herself using the digital still camera, he or she must use a special adaptor such as a self-portrait mirror adaptor, for example, an adaptor mounted on Konica Revio Z3 (made by Konica Co. Ltd.).

As described above, digital still cameras available now have various disadvantages.

Incidentally, Japanese Unexamined Patent Application Publication No. 11-316397 discloses a technology for applying an electric paper sheet to an electronic display. Further, an article as to an electric paper sheet (electronic paper) appears in a magazine "ASCII", pages 220-225, February 2000 and pages 242-247, March 2000.

According to the publication and the article, when an electric field is applied to countless microscopic spheres, which freely float in an oil fluid in a gap between two plastic sheet and half portions of which are painted black and the remaining half portions of which are painted white, from the outside of the plastic films, the spheres can be rotated and fixed. At that time, the white surfaces and the black surfaces of the spheres can be caused to face a surface of the plastic sheets by the rotation of them, whereby a black and white pattern and character can be caused to come to the surface of the plastic sheets, and this principle can be applicable to display a color image.

Further, according to the publication, when transparent microcapsules each having a diameter of about 0.1 mm and containing a multiplicity of white spheres floating in a blue fluid therein are two-dimensionally disposed between sheets and the white spheres in microcapsules are moved in one direction by Coulomb attraction by applying an electric field to the microcapsules from both the surfaces of the sheets, a color of the portion of the sheets, where the microcapsules containing the while spheres having moved in the one direction are located, is changed from blue to white. The publication describes that a color image can be reproduced based on this principle.

However, any of the conventional photographing apparatuses in Japanese Unexamined Patent Application Publication Nos. 8-43956, 9-203956 and the like is such that photographed information is recorded in a camera with a data recording function, for example, in a lens-fitted photographic film package to which an IC memory is added, and the photographed information is simply used when a print is processed. Thus, in the conventional photographing apparatuses, a function for improving an amusement property such as a combination of a photographed image with a specific character according to, for example, a photographed place is not taken into consideration at all. Therefore, when an amusement property is required as in a picture taken in an amusement park, a requirement of customers is not sufficiently satisfied.

Further, the electronic paper disclosed in Japanese Unexamined Patent Application Publication No. 11-316397 and the literature has such advantages that the power consumption of the electronic paper is smaller than that of a conventional liquid crystal display because an image displayed once by application of an electric field is maintained without disappearing until a next electric field is applied and that the electronic paper does not have visual field dependency as in the liquid crystal display which greatly varies a degree of density of an image depending upon an angle at which the liquid crystal display is viewed. However, there is a problem that the electronic paper does not yet become commercially practical.

Furthermore, while a film liquid crystal using ferroelectric liquid crystal has been developed as the electronic paper, there is a problem that it is not yet practically used.

SUMMARY OF THE INVENTION

Accordingly, it is a first subject of the present invention, which was made in view of the above problems, to provide an image photographing/reproducing system and method capable of providing a customer with a photographing apparatus such as a lens-fitted photographic film package, a camera and the like which improves an amusement property of images reproduced on prints and the like and an amusement property in photographing by combining a photographed image with composite data of images, documents, and the like of specific characters, and the like according to photographed places in predetermined regions such as parks, sightseeing spots, amusement facilities, sports arenas, baseball grounds, amusement places, amusement parks, theme parks, and the like or by recording the composite data in association with the photographed places, and to provide a photographing apparatus and an image reproducing apparatus as well as an image reproducing method used in the above system and method.

Further, a second subject of the present invention, which was made to solve the problems of the conventional liquid crystal monitor, is to provide a photographing apparatus such as a camera with a display screen, and the like which permits an image to be photographed, an image having been photographed, and so on to be confirmed easily and promptly making use of a sheet-like image display device such as the above-mentioned various electric paper sheets (electronic papers), and the like and the operability of which is improved when various parameters.

In order to attain the first object described above, the first aspect of the present invention provides an image photographing/reproducing system, comprising: an photographing apparatus for photographing an image using a photographing lens in a predetermined region and recording a photographed image in an image recording medium; first communication unit capable of transmitting and receiving information to and from second communication unit at a communication point installed in the predetermined region when the image is photographed; information recording unit for recording at least one of photographed frame information or photographed time information of the photographed image and first identification information of the image recording medium, and second identification information of the communication point, at least one of the photographed frame information, the photographed time information, the first identification information and the second identification information being transmitted and received between the first communication unit and the second communication unit when the image is photographed and an image reproducing apparatus, including: photographed image acquiring unit for acquiring the photographed image recorded in the image recording medium of the photographing apparatus when the photographed image is reproduced; information acquiring unit for acquiring at least one of the photographed frame information or the photographed time information of the photographed image and the first identification information, and the second identification information from the information recording unit; data acquiring unit for determining a photographed place of the photographed image of the photographed frame based on the second identification information and acquiring at least one of predetermined image data, document data, audio data and program data corresponding to the photographed place as composite data; image reproducing unit for reproducing the photographed image acquired by the photographed image acquiring unit and recorded in the image recording medium as a reproduced image; and data recording unit for recording the composite data acquired by the data acquiring unit in association with the reproduced image having been reproduced by the image reproducing unit.

Preferably, the first communication unit is provided with the photographing apparatus.

Preferably, the photographing apparatus further includes the information recording unit that records the second identification information of the communication point received by the first communication unit from the second communication unit at the communication point.

Preferably, the first communication unit is disposed to a card with a communication function corresponding to the photographing apparatus.

Preferably, the card with the communication function further includes the information recording unit that records the second identification information of the communication point which the first communication unit has received from the second communication unit at the communication point.

Preferably, the image recording unit is disposed in the predetermined region as a database; the first communication unit transmits, when the image is photographed, the photographed frame information or the photographed time information having been acquired by the photographing apparatus and the first identification information of the image recording medium to the second communication unit at the communication point; the communication point causes the database in the predetermined region to record and manage the photographed frame information or the photographed time information received by the second communication unit and the first identification information together with the second identification information of the communication point; and the information acquiring unit acquires, when the photographed image is reproduced, the photographed frame information or the photographed time information, the first identification information, and the second identification information by reading them from the database.

Preferably, the first communication unit is disposed in an integrated circuit chip.

Preferably, the first communication unit and the information recording unit are integrated with each other as an integrated circuit chip.

Preferably, the image recording medium is a photographic film.

Preferably, the integrated circuit chip is mounted on the Patrone of the photographic film.

Preferably, the photographing apparatus is a lens-fitted photographic film package.

Preferably, the image recording medium is an image data recording medium.

Preferably, the integrated circuit chip is mounted on a housing accommodating the image data recording medium.

Preferably, the photographing apparatus is a digital still camera or a digital video camera.

Preferably, the image reproducing unit reproduces the reproduced image of the photographed image as a photographic print; and the data recording unit combines the composite data with the reproduced image or prints the composite image on the back surface of the photographic print.

Preferably, the image reproducing unit is a media driver for recording the image data of the reproduced image of the photographed image in the image data recording medium; and the data recording unit combines the composite data with the image data of the reproduced image or records the composite data to the header of the image data of the reproduced image.

Preferably, the image reproducing unit is image data delivering unit for delivering the image data of the reproduced image of the photographed image through a communication network; and the data recording unit combines the composite data with the image data of the reproduced image or records the composite data to the header of the image data of the reproduced image.

Preferably, the photographed frame information is a photographed frame number; and the identification information of the communication point is an identification number of the communication point.

Preferably, the communication point is a gate installed in the predetermined region; and the identification number information of the communication point is gate information indicating a predetermined place in the predetermined region.

Preferably, the second identification information of the communication point is information indicating a predetermined photographed place, or information including information indicating the predetermined photographed place and a predetermined image or document corresponding to the predetermined photographed place.

Preferably, when a plurality of photographed frames exist in correspondence to the same communication point, at least one of predetermined different image data, document data, audio data and program data corresponding to the photographed place is allocated to each photographed frame.

Preferably, date and time information is further added to the second identification information of the communication point, and a photographed date and time or time zone is recorded on each print.

Preferably, photographed frames corresponding to the same communication point are classified into the same group, and an index print is produced by combining the images recorded on the photographed frames with a particular background image.

Preferably, the photographing apparatus further comprises: a memory for previously recording audio data or an audio data receiving unit for receiving predetermined audio data corresponding to the communication point therefrom; and a speaker for reproducing and outputting the audio data recorded by the memory or the audio data received from the communication point by the audio data receiving unit; wherein the audio data is reproduced and output each photographed frame or each operation by the speaker.

Preferably, the photographing apparatus further comprises: an image display section disposed on the exterior of a housing and comprising a sheet-like image display device; and an image display adjustment unit for adjusting an image displayed on the image display section.

Preferably, the image display section comprises a plurality of image display surfaces disposed on a plurality of surfaces of the housing.

Preferably, the image display adjustment unit selects image data to be displayed on the image display section and displays at least one of a reduced image of the photographed image, an image to be photographed, an operation setting screen, and an operation explanation screen on the image display section.

Preferably, the photographing apparatus comprises image data acquiring unit for acquiring image data; and the image display adjustment unit displays an image acquired based on the image data acquired by the image data acquiring unit on the image display section.

Preferably, the image data acquiring unit acquires the image data previously stored in the image recording medium or a data recording unit, or receiving image data by an image data receiving unit; and the image display adjustment unit displays the image acquired based on the acquired image data on the image display section at a predetermined timing.

In order to attain the first object described above, the second aspect of the present invention provides an image photographing/reproducing method, comprising the steps of: on a side of a photographing apparatus, photographing an image using a photographing lens in a predetermined region and recording a photographed image in an image recording medium; recording, when the image is photographed, at least one of photographed frame information or photographed time information of the photographed image and first identification information of the image recording medium, and the identification information of the communication point which are obtained by communicating between the photographing apparatus and a communication point installed in the predetermined region; when the photographed image is reproduced on a side of an image reproducing apparatus, acquiring the photographed image recorded in the image recording medium of the image photographing apparatus; acquiring at least one of the photographed frame information or the photographed time information of the photographed image and the first identification information, and the second identification information; determining a photographed place of the photographed image of the photographed frame based on the second identification information and acquiring at least one of predetermined image data, document data, audio data and program data corresponding to the photographed place as composite data; reproducing the photographed image that is acquired as a reproduced image; and recording the composite data corresponding to the reproduced image.

In order to attain the first object described above, the third aspect of the present invention provides a photographing apparatus for photographing an image using a photographing lens in a predetermined region, comprising: an image recording medium for recording a photographed image; first communication unit capable of transmitting and receiving information to and from second communication unit at a communication point installed in the predetermined region; and information recording unit for recording, when the image is photographed, photographed frame information or photographed time information of the photographed image and second identification information of the communication point received by the first communication unit from the second communication unit at the communication point, wherein the photographed frame information or the photographed time information and the second identification information are utilized when the photographed image is reproduced.

Preferably, when the photographed image is reproduced, the photographed frame information or the photographed time information and the second identification information which are recorded on the information recording unit, or first identification information of the image recording medium, the photographed frame information and the second identification information are read out.

Preferably, the first communication unit transmits, when the image is photographed, the photographed frame information or the photographed time information and first identification information of the image recording medium which are recorded on the information recording unit to the second communication unit at the communication point; the communication point causes a database in the predetermined region to record and manage the photographed frame information or the photographed time information and the first identification information received by the second communication unit together with the second identification information; and when the photographed image is reproduced, the photographed frame information or the photographed time information, the first identification information and the second identification information are read out from the database.

It is preferable that the photographing apparatus further comprises: a memory for previously recording audio data or an audio data receiving unit for receiving predetermined audio data corresponding to the communication point therefrom; and a speaker for reproducing and outputting the audio data recorded by the memory or the audio data received from the communication point by the audio data receiving unit; wherein the audio data is reproduced and output each photographed frame or each operation by the speaker.

It is also preferable that the photographing apparatus further comprises: an image display section disposed on the exterior of a housing and comprising a sheet-like image display device; and an image display adjustment unit for adjusting an image displayed on the image display section.

In order to attain the first object described above, the fourth aspect of the present invention provides the image reproducing apparatus, comprising: photographed image acquiring unit for acquiring an image photographed using a photographing lens of a photographing apparatus in a predetermined region and recorded in an image recording medium; information acquiring unit for acquiring, when the image is photographed, photographed frame information or photographed time information of the photographing apparatus and second identification information of a communication point installed in the predetermined region that is received from second communication unit at the communication point; data acquiring unit for determining, when the photographed image is reproduced, a photographed place of the photographed image of the photographed frame based on the photographed frame information and/or the photographed time information and the second identification and acquiring at least one of predetermined image data, document data, audio data and program data corresponding to the photographed place as composite data; image reproducing unit for reproducing the photographed image acquired by the photographed image acquiring unit and recorded in the image recording medium as a reproduced image; and data recording unit for recording the composite data acquired by the data acquiring unit in association with the reproduced image reproduced by the image reproducing unit.

In order to attain the first object described above, the fifth aspect of the present invention provides an image reproducing method, comprising the steps of: providing an integrated circuit chip having an information recording function and a communication function with a lens-fitted photographic film package; transmitting, when an image is photographed, data between the lens-fitted photographic film package and a predetermined gate having a data communication function, receiving gate information indicating a predetermined place from the gate by the intergrated circuit chip, and recording the gate information in the intergrated circuit chip together with photographed frame number information; and reading, when the photographed image is reproduced, the photographed frame information and the gate information recorded in the intergrated circuit chip, determining a photographed place of each photographed frame from the gate information, and combining a predetermined image or document corresponding to the photographed place of each photographed frame with the reproduced image of each photographed frame, back printing the predetermined image or document or recording the predetermined image or document in association with the photographed place.

The present invention provides an image reproducing method, comprising the steps of: providing an intergrated circuit chip having a transmission function with a lens-fitted photographic film package; transmitting, when an image is photographed, data between the lens-fitted photographic film package and a predetermined gate having a data communication function, receiving gate information indicating a predetermined place from the gate by the integrated circuit chip, receiving an identification code and photographed frame number information of the lens-fitted photographic film package side by the gate, recording and managing the photographed frame number information by a center computer together with gate information indicating a predetermined place; and reading, when the photographed image is reproduced, the photographed frame number information and the gate information corresponding to the identification code from the center computer, determining a photographed place of each photographed frame from the gate information, and combining a predetermined image or document corresponding to the photographed place of each photographed frame with the reproduced image of each photographed frame, back printing the predetermined image or document or recording the predetermined image or document in association with the photographed place.

The present invention provides an image reproducing method, comprising the steps of: providing an intergrated circuit chip having an information recording function and a communication function with a Patrone of a film; transmitting, when an image is photographed by a camera on which the Patrone is loaded, data between the Patrone and a predetermined gate having a data transmitting/receiving function, receiving gate information indicating a predetermined place from the gate by the IC chip, and recording the gate information in the integrated circuit chip together with photographed frame number information; and reading, when the photographed image is reproduced, the photographed frame number information and the gate information recorded in the integrated circuit chip, determining a photographed place of each photographed frame from the gate information, and combining a predetermined image or document corresponding to the photographed place of each photographed frame with the reproduced image of each photographed frame, back printing the predetermined image or document or recording the predetermined image or document in association with the photographed place.

The present invention provides an image reproducing method, comprising the steps of: providing an integrated circuit chip having an information recording function with a Patrone of a film; transmitting, when an image is photographed by a camera having a communication function and the Patrone loaded thereon, data between the camera and a predetermined gate having a data communication function, receiving gate information indicating a predetermined place from the gate by the camera, and recording the gate information in the intergrated circuit chip of the Patrone together with photographed frame number information; and reading, when the photographed image is reproduced, the photographed frame number information and the gate information recorded in the intergrated circuit chip, determining a photographed place of each photographed frame from the gate information, and combining a predetermined image or document corresponding to the photographed place of each photographed frame with the reproduced image of each photographed frame, back printing the predetermined image or document or recording the predetermined image or document in association with the photographed place.

The present invention provides an image reproducing method, comprising the steps of: providing an intergrated circuit chip having a transmission function with a Patrone of a film; transmitting, when an image is photographed, data between the Patrone and a predetermined gate having a data communication function, receiving a identification code and photographed frame number information of the Patrone by the gate, and recording and managing the photographed frame number information by a center computer together with gate information as to each gate; and reading, when the photographed image is reproduced, the photographed frame number information and the gate information corresponding to the identification code from the center computer, determining a photographed place of each photographed frame from the gate information, and combining a predetermined image or document corresponding to the photographed place of each photographed frame with the reproduced image of each photographed frame, back printing the predetermined image or document or recording the predetermined image or document in association with the photographed place.

Preferably, the gate information is information indicating a predetermined photographed place, or information including information indicating a predetermined photographed place and a predetermined image or document corresponding to the predetermined photographed place.

Preferably, when a plurality of photographed frames exist in correspondence to the same gate, a predetermined different image or document corresponding to the photographed place is allocated to each photographed frame.

Preferably, date and time information is further added to the gate information, and the photographed date and time or time zone is recorded on each print.

Preferably, photographed frames corresponding to the same gate are classified into the same group, and an index print is created by combining the images recorded on the photographed frames with a particular background image.

Preferably, the image reproducing processing is processing for outputting a photographic print of the reproduced image, processing for outputting an image data recording medium in which the image data of the reproduced image is recorded, or processing for delivering the image data of the reproduced image through a communication network.

The present invention provides a photographing apparatus acting as a lens-fitted photographic film package having a photographing lens and a shutter mechanism, comprising: an integrated circuit chip with a data receiving mechanism disposed in a housing of the lens-fitted photographic film package for previously recording audio data or receiving predetermined audio data corresponding to a predetermined gate therefrom; and a speaker for reproducing and outputting the audio data recorded by the integrated circuit chip or the audio data received from the gate, wherein the audio data is reproduced and output each photographed frame or each operation.

In order to attain the second object described above, the sixth aspect of the present invention provides a photographing apparatus acting as a camera with a display screen for photographing an image using a photographing lens, comprising: an image display section disposed on the exterior of a housing and comprising a sheet-like image display device; and an image display adjustment unit for adjusting an image displayed on the image display section.

Preferably, the image display section comprises a plurality of image display surfaces disposed on a plurality of surfaces of the housing.

Preferably, the image display adjustment unit selects image data to be displayed on the image display section and displays at least one of a reduced image of a photographed image, an image to be photographed, an operation setting screen, and an operation explanation screen on the image display section.

Preferably, the the camera with the display screen comprises image data acquiring unit for acquiring image data; and the image display adjustment unit displays an image acquired based on the image data acquired by the image data acquiring unit on the image display section.

Preferably, the image data acquiring unit acquires the image data previously stored in an image recording medium or a data recording unit, or receiving image data by an image data receiving unit; and the image display adjustment unit displays the image acquired based on the acquired image data on the image display section at a predetermined timing.

DESCRIPTION OF THE PREFERRED EMBODIMENTS

An image photographing/reproducing system and method, and a photographing apparatus and an image reproducing apparatus as well as an image reproducing method used in the above system and method according to the present invention will be described below in detail based on the preferred embodiments shown in the accompanying drawings.

Image photographing/reproducing systems and methods according to first and second aspects of the present invention, and a photographing apparatus and an image reproducing apparatus as well as an image reproducing method, which are used in the above systems and methods, according to third, fourth and fifth aspects of the present invention can increase an amusement property of photographic prints and output images. The amusement property of them can be increased, when pictures are taken in predetermined regions such as parks, sightseeing spots, amusement facilities, sports arenas, baseball grounds, amusement places, amusement parks, theme parks, and the like, by combination and the like of reproduced images as prints and so on with images (reference images) or messages (documents) of the facilities and structures of theme pavilions and the like where the pictures are taken and with images (reference images) or messages (documents) of the scenes, buildings, symbols, characters, attractions, and the like which relate to places where the pictures are taken. Note that while the following description will be made as to a theme part as a representative example of the predetermined region where a picture is taken, the present invention is not limited thereto, and it is needless to say that any region is acceptable as the predetermined region so long as it includes points suitable for photographing.

Figure 1:
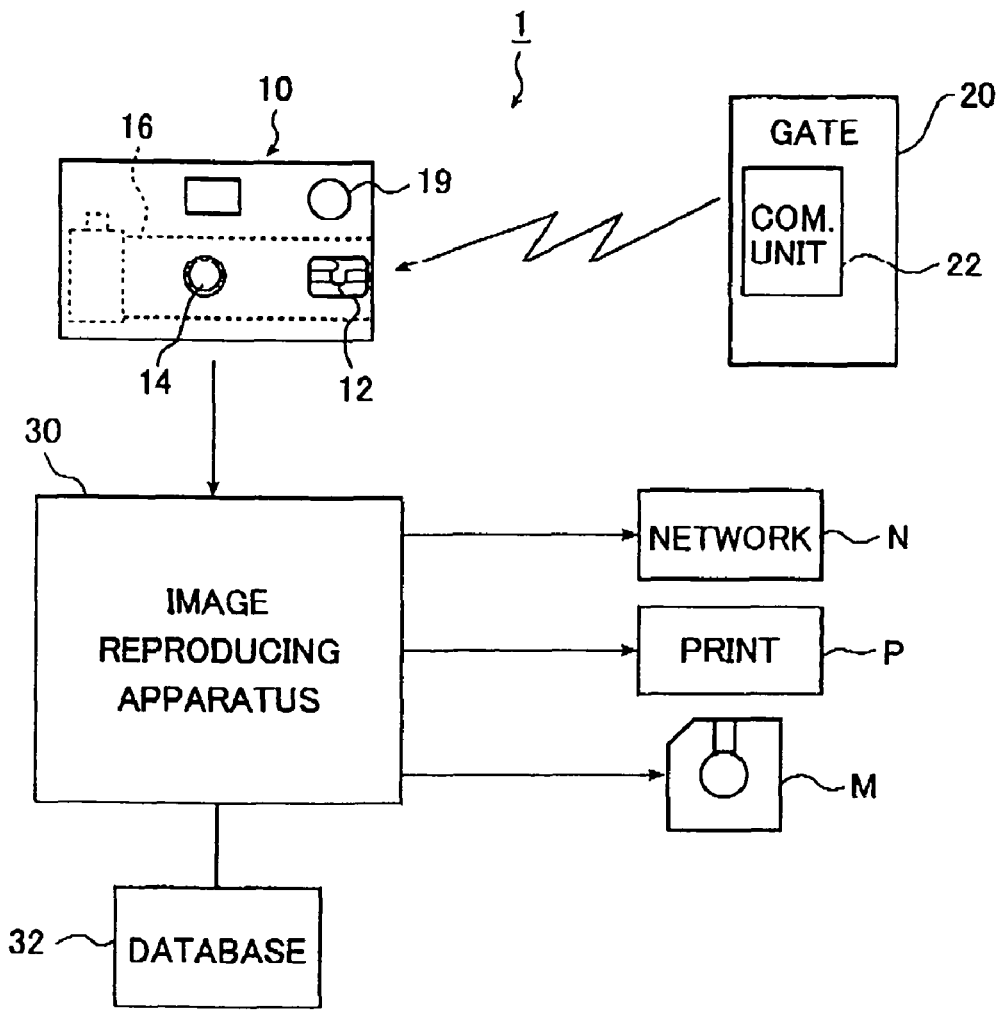
FIG. 1 is a block diagram schematically explaining an embodiment of an image photographing/reproducing system according to the present invention.

FIG. 1 is a schematic block diagram explaining an example of an image photographing/reproducing system according to a first embodiment of the first aspect of the present invention embodying the image photographing/reproducing method of the second aspect of the present invention.

The image photographing/reproducing system 1 shown in FIG. 1 embodies the image photographing/reproducing method of the second aspect of the present invention and the image reproducing method of the fifth aspect of the present invention. The image photographing/reproducing system 1 includes a lens-fitted photographic film package 10, an image reproducing apparatus 30, and a database 32, wherein the lens-fitted photographic film package 10 can transmit and receive data to and from gates 20 installed in predetermined regions such as parks, sightseeing spots, amusement facilities, sports arenas, baseball grounds, amusement places, amusement parks, theme parks, and the like; the image reproducing apparatus 30 reproduces images photographed by the lens-fitted photographic film package 10 and outputs reproduced images; and the database 32 is connected to the image reproducing apparatus 30 to acquire composite data which is combined with the reproduced images or recorded in associated with the reproduced images.

Figure 2A:
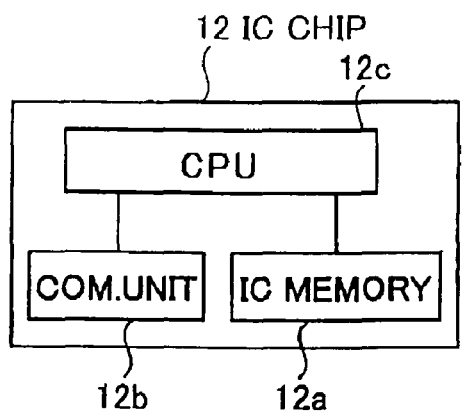
FIG. 2A is a block diagram of an embodiment of an IC chip of a lens-fitted photographic film package used in the image photographing system shown in FIG. 1.

The lens-fitted photographic film package 10 is the photograph apparatus of the third aspect of the present invention and includes a photographing lens 14 and a photographic film 16 as well as an IC chip 12 disposed in a housing thereof. The IC chip 12 is connected to a power supply, preferably to a battery (not shown) built in the lens-fitted photographic film package 10. As shown in FIG. 2A, the IC chip 12 includes a CPU 12c for executing simple processing as well as a communication unit 12b and an IC memory 12a, wherein the communication unit 12b has a communication function including at least a receiving function and can make data communication; and the IC memory 12a can store information such as communication data and the like.

In contrast, the gates 20 acting as communication points are installed at the respective entrances of the theme pavilions and the theme areas in a predetermined region, for example, a theme park so that data communication can be carried out between each gate 20 and the communication unit 12b of the IC chip 12 of the lens-fitted photographic film package 10 carried by a customer through a communication unit 22 disposed in each gate 20.

The customer carrying the lens-fitted photographic film package 10 enters a theme park, moves therein, and passes through a gate 20 installed at the entrance of each theme pavilion or a theme area. At that time, when the customer directs the housing of the lens-fitted photographic film package 10 carried by him or her toward the gate 20, gate relating information is transferred from the communication unit 22 of the gate 20 to the communication unit 12b of the IC chip 12 of the lens-fitted photographic film package 10. The gate relating information includes gate identification (ID) data, date/time data, and the like. The lens-fitted photographic film package 10, which has received the gate relating information from the communication unit 22 of the gate 20 to the communication unit 12b thereof stores the gate relating information in the IC memory 12a of the IC chip 12 while relating it to photographed frame information such as a photographed frame number and the like at that time. A place where the gate 20 is located can be found from the gate identification data, and thus a place where a frame related to the gate 20 was photographed can be determined.

With this operation, the same gate identification information is applied to the frames photographed from a time the customer passes through one gate to a time he or she passes through a next gate so that it can be found that the frames have been photographed in the same theme pavilion or the same theme area.

It should be noted that the pass gate 20 is not only installed at only the entrance of one theme area and the like but also installed at the exit of each theme park, whereby a degree of accuracy at which photographed frames are checked against photographed places can be improved. Further, when the pass gate is also installed at predetermined photographing points so that a frame photographed at the point can be identified, a more meticulous service can be added and the amusement property can be more increased.

To provide a more meticulous service, it is preferable to install communication points and gates where communication is executed to the lens-fitted photographic film package 10 so as to cover all the places in the theme area of a theme park through which a customer passes.

Figure 3:
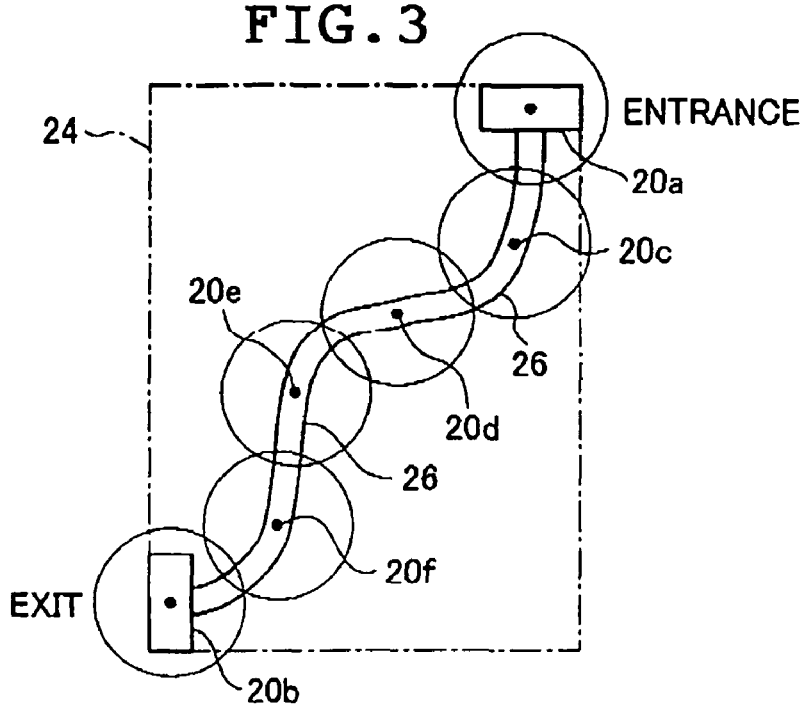
FIG. 3 is a view schematically explaining an example of disposition of gates used in the image photographing/reproducing system shown in FIG. 1.

It is preferable, for example, not only to install pass gates (or communication points) 20a and 20b at the entrance and the exist of a predetermined theme area 24 but also to install pass gates or communication points 20c, 20d, 20e, 20f, and the like along a path 26 in the theme area 24 so that the communication area of the lens-fitted photographic film package 10 carried by the customer overlaps the communication areas of the pass gates or the communication points to permit the lens-fitted photographic film package 10 to communicate therewith at any point in the theme area 24 as shown in FIG. 3.

On the completion of photographing, the customer places an order for prints with a laboratory which are created from the lens-fitted photographic film package 10 photographed in the theme park. The laboratory reproduces the images photographed on the respective frames of the lens-fitted photographic film package 10 by the image reproducing apparatus 30 as well as reads the gate relating information and the like recorded in the IC chip 12 of the lens-fitted photographic film package 10. Then, the laboratory reads specific images such as the images (reference images) and the messages (documents) of characters relating to the photographed frames based on the above information from the database 32 in which a lot of reference images and documents are previously recorded or captures the specific images through the Internet and the like, combines them with the reproduced images of the photographed frames, and creates and outputs output (reproduced) images such as photographic prints P and the like having a high degree of the amusement property. At that time, the above specific images may be displayed on the front surfaces of the photographic prints P by being combined with the images printed thereon or may be printed on the back surfaces of the photographic prints P. It is preferable that the customer can optionally select whether they are combined on the front surfaces of the photographic prints P or printed on the back surfaces thereof.

It should be noted that the output (reproduced) images outputted from the image reproducing apparatus 30 are not limited to the ones outputted as the photographic prints P but may be outputted as an image data recording medium M in which the image data of the output (reproduced) images are recorded. Otherwise, the image data of the output (reproduced) images may be directly distributed to predetermined addresses through a communication network N such as the Internet and the like. At that time, audio data, program data and so on may be used as the composite data to be combined with the reproduced images, in addition to image (still image/moving image) data and document (text) data.

Incidentally, while the IC chip 12, which can communicate with a pass gate 20 in the predetermined region such as the theme part and the like is disposed in the lens-fitted photographic film package 10 in the embodiment shown in FIG. 1, it may be disposed at any position so long as the position is located in the lens-fitted photographic film package 10. That is, the IC chip 12 may be disposed in the housing of the lens-fitted photographic film package 10 or mounted on the Patrone of a photographic film assembled in the lens-fitted photographic film package 10.

Figure 4A:
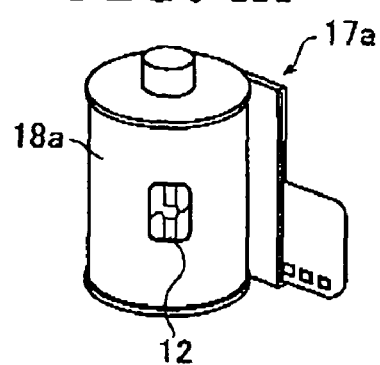
FIG. 4A is a schematic perspective view of an embodiment a photographic film with an IC chip used in the image photographing system shown in FIG. 1.
Figure 4B:
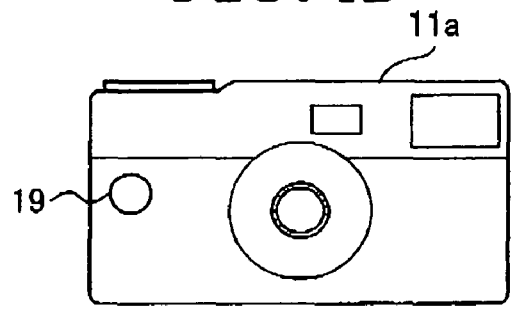
FIG. 4B is a schematic front elevational view of an example of a film camera for taking a picture using the photographic film shown in FIG. 4A loaded thereon.

Note that while the IC chip 12 is disposed in the lens-fitted photographic film package 10 in the illustrated example, the present invention is not limited thereto and the IC chip 12 may be mounted on the Patrone 18a of a photographic film 17a as shown in FIG. 4A or mounted on a conventional film camera 11a as shown in FIG. 4B. Note that the photographic film 17a may be used in the lens-fitted photographic film package 10.

Incidentally, the IC chip 12 may be used in a movie camera used for a moving picture and a still picture, in addition to the film camera 11a used for a still picture. In this case, the provision of the IC chip with the package of a movie film can achieve a similar object.

Figure 5A:
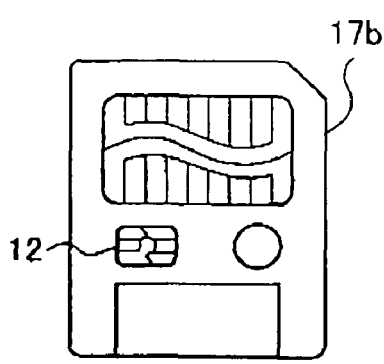
FIG. 5A is a schematic front elevational view of an embodiment an image memory with an IC chip used in the image photographing system shown in FIG. 1.
Figure 5B:
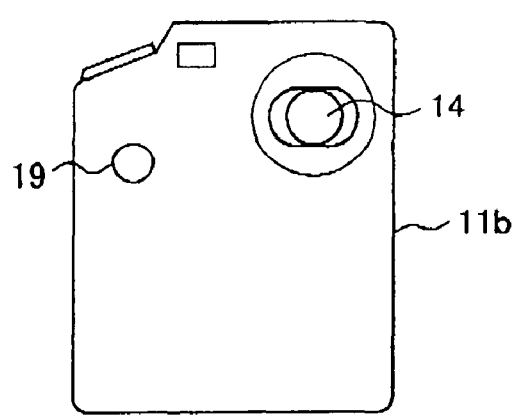
FIG. 5B is a schematic front elevational view of an embodiment of a digital camera for taking a picture using the image memory shown in FIG. 5A and loaded thereon.

Further, the IC chip 12 may be disposed to an image IC memory such as a smart media, a memory stick, a multimedia card, a compact flush (flush memory), a memory card, and the like and to an image memory medium 17b such as a FD and the like as shown in FIG. 5A or may loaded on a digital camera 11b such as a digital still camera, a digital video camera, a digital movie camera, and the like as shown in FIG. 5B. Also in this case, an image as a target of the present invention may be a moving image, in addition to a still image.

Figure 6:
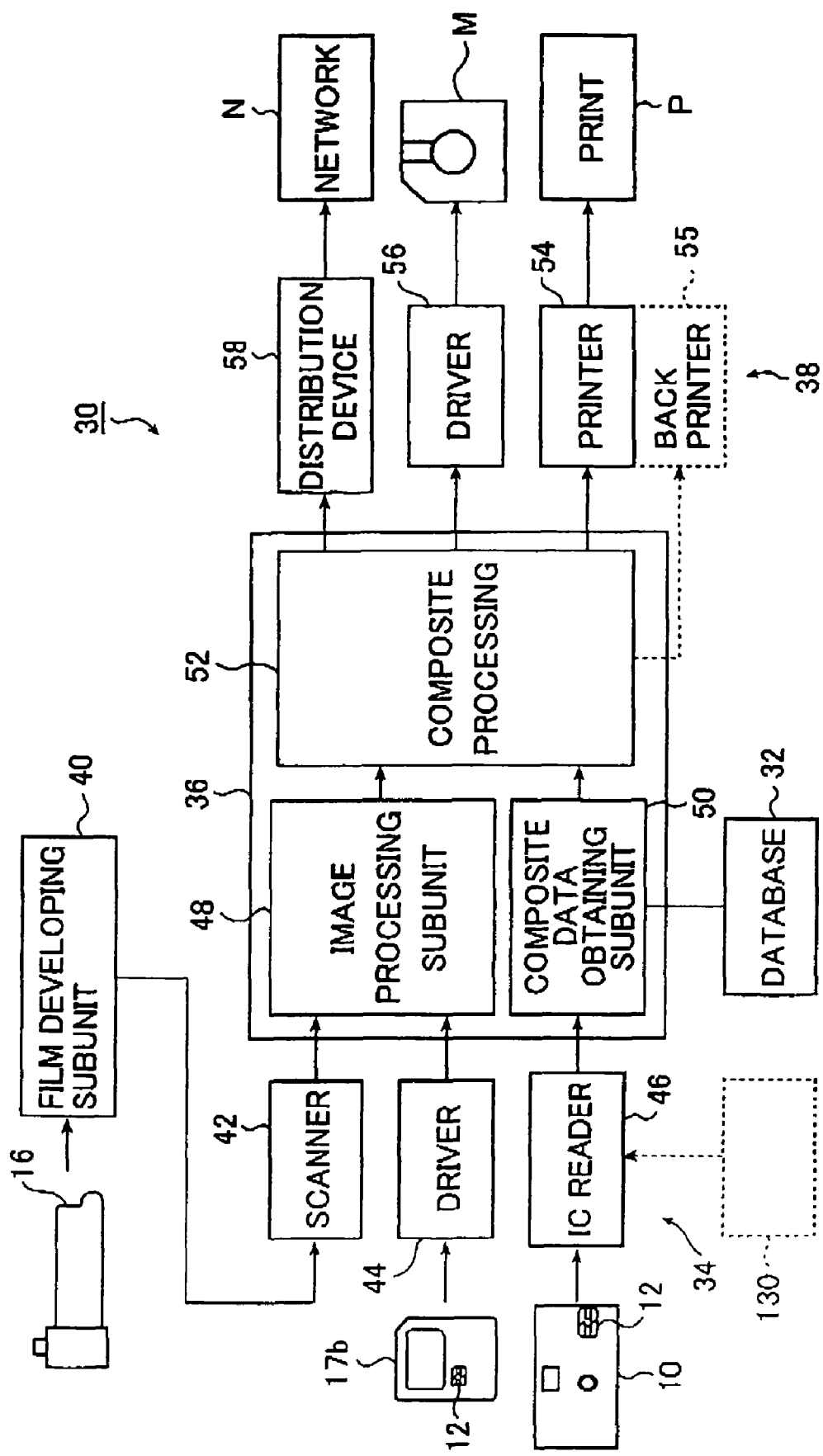
FIG. 6 is a schematic block diagram showing an embodiment of an image reproducing apparatus used in the image photographing/reproducing system shown in FIG. 1.

FIG. 6 shows a block diagram of an embodiment of the image reproducing apparatus 30 according to the fourth aspect of the present invention. The image reproducing apparatus 30 outputs reproduced images such as photographic prints P, and the like from the photographed lens-fitted photographic film package 10, the photographed film 17a of the film camera 11a, and the photographed image memory medium 17b of the digital camera 11b as described above.

As shown in FIG. 6, the image reproducing apparatus 30 of the fourth aspect of the present invention is composed of an input unit 34, a processing unit 36, and an output unit 38.

The input unit 34 includes a film developing subunit 40, a scanner 42, a media driver 44, and an IC reader 46, wherein the film developing subunit 40 develops the photographed film 16 of the lens-fitted photographic film package 10, the photographed film 17a of the film camera 11a; the scanner 42 acquires image data by photoelectrically reading the images recorded on the respective photographed frames of the films 16 and 17 developed by the film developing subunit 40; the media driver 44 reads out image data from the image memory medium 17b of the digital camera 11b; and the IC reader 46 reads out gate information corresponding to photographed frame information such as photographed frame numbers and the like from the IC memory 12a of the IC chip 12 of the lens-fitted photographic film package 10, the Patrone 18a of the photographed photographic film 17a, the image memory medium 17b, and the like.

The processing unit 36 includes an image processing subunit 48, a composite data acquiring subunit 50, and a composite processing subunit 52, wherein the image processing subunit 48 receives the image data of the predetermined photographed frames read out by the scanner 42 and the media driver 44 and subjects the image data to predetermined image processing; the composite data acquiring subunit 50 determines the photographed places of the photographed frames from the gate information of the photographed frames read by the IC reader 46 and acquires predetermined images and documents, which correspond to the thus determined photographed places, as composite data by, for example, searching the database 32, and the like or by the communication through the Internet, and the like; and the composite processing subunit 52 combines the image-processed image data supplied from the image processing subunit 48 with the composite data acquired by the composite data acquiring subunit 50.

The composite processing subunit 52 is not limited to the one that acquires composite image data by combining, as image data, the composite data from the composite data acquiring subunit 50 with the image data, which has been subjected to the image processing, from the image processing subunit 48. That is, the composite processing subunit 52 may be arranged such that when, for example, a photographic print P is outputted, it may create back print data to be combined with an image reproduced by front side image-processed image data as a back print. Otherwise, when image data is outputted from the image data recording medium M or through the communication network N, the composite processing subunit 52 may may create associating data to be recorded at a header, a footer or the like in association with the image data of the reproduced image.

The output unit 38 includes a printer 54, a media driver 56, and a distribution subunit 58, wherein the printer 54 outputs the image-processed image data from the image processing subunit 48 or outputs the composite image data acquired by combining the image-processed image data with the composite data from the composite data acquiring subunit 50 as the photographic print P; the media driver 56 records the image-processed image data or the composite image data to the image data recording medium M and outputs recorded image data from the image data recording medium M; and the distribution subunit 58 distributes the image-processed image data or the composite image data through the communication network N such as the Internet. Note that when only the image reproduced from the image-processed image data is reproduced on the front surface of the photographic print, the printer 54 is provided with a back printer 55 for back printing the composite data.

Note that when the composite data acquiring subunit 50 acquires a predetermined image and document corresponding to a place where a certain frame is photographed, it can be found that frames in a certain range were photographed in a similar theme pavilion or theme area because the gate relating information read out from the communication unit 12b of the IC chip 12 is caused to correspond to photographed frame information (numbers) and the photographed frame numbers corresponding to the each gate or communication point 20 can be found. When there are a plurality of frames which correspond to the same gate (communication point) as described above, it is possible to combine a different reference image for each frame.

For example, a plurality of patterns of characters and the like, who appear in a tale relating to an "abc" castle, an "xyz" residence and the like, are prepared previously, and a reference image of a character of a different pattern is appropriately selected therefrom and combined. Otherwise, a document explaining a tale or a theme in which the character appear may be combined. Note that the image and document may be back printed in place of being combined on the front surface of a print.

Note that it is preferable to record the identification information of a customer (customer ID) in the database 32 of the image reproducing apparatus 30 of the laboratory and to modify the composite data to be combined with the images reproduced from photograph images in accordance with the total number of visit of the customer to a predetermined region such as a theme part and the like. This arrangement can improve an amusement property of a repeater because it can prevent the same composite data from being combined with or distributed to the same customer.

Further, since the gate information includes date and time data in addition to the gate identification information for indicating a photographed place by identifying a gate, a photographed date and time and a photographed time zone can be recorded on a print.

Furthermore, since an area where an image is photographed on a particular frame can be specified, it is possible to combine an image and the like brought by a customer in response to the desired of the customer.

Further, since a route along which a customer walked in a theme part can be found from the gate identification information, a print showing the overall arrangement of theme park, on which the route where the customer passed and the time at which the customer passed the route are recorded, may be created as a service. With this service, the customer can be more enjoyed with a photograph when he or she reviews it later. Thus, the recording property and the amusement property of photograph can be more increased. Further, at that time, photographs may be summarized like an index print.

Furthermore, photographed frames corresponding to the same gate may be classified into the same group, and an index print may be created by combining the images recorded on these photographed frames with a particular background image.

Next, an example of the image photographing/reproducing system according to a second embodiment of the present invention will be explained.

Figure 7:
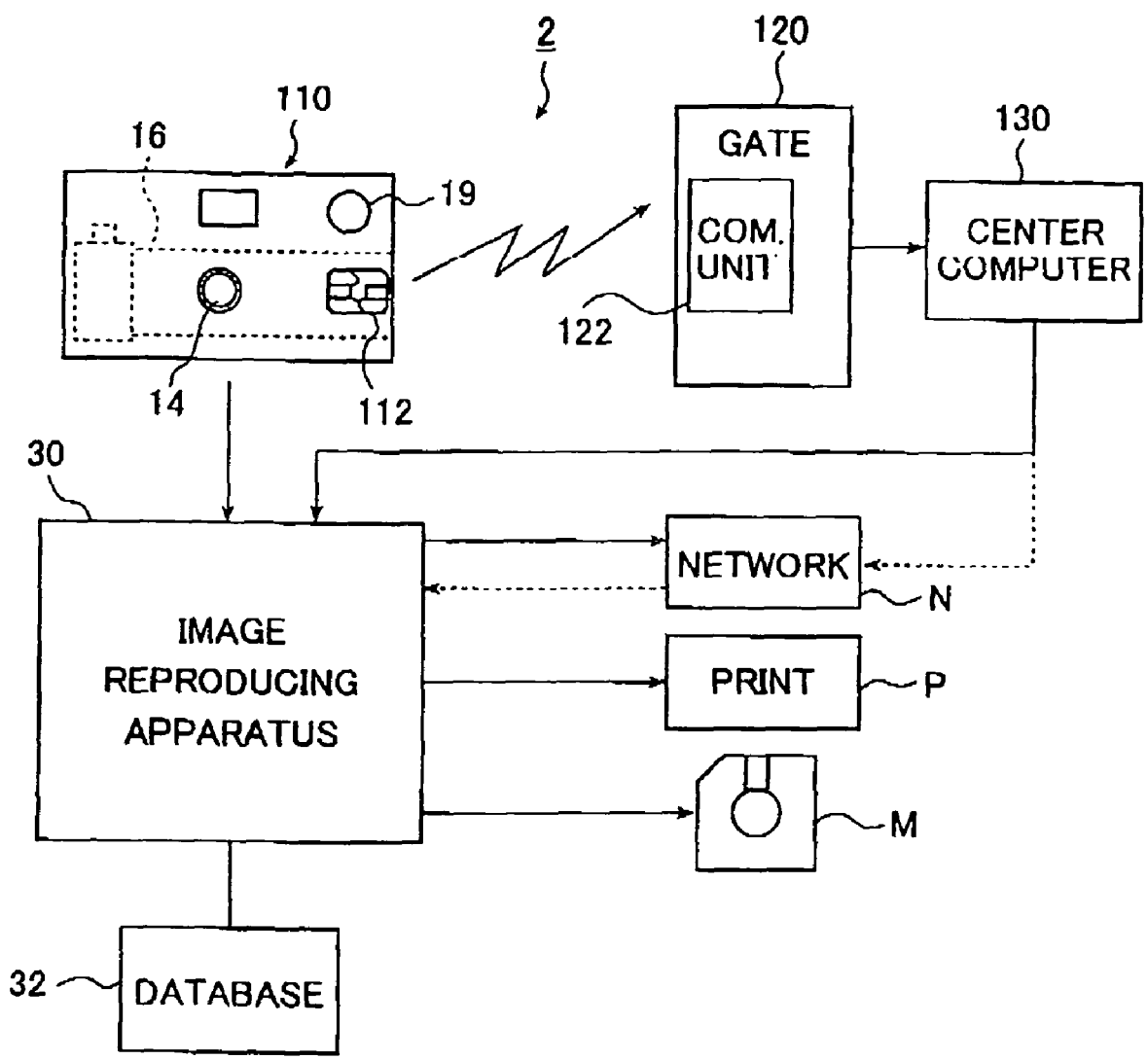
FIG. 7 is a schematic block diagram showing another embodiment of the image photographing/reproducing system according to the present invention.

FIG. 7 is a schematic block diagram showing the example of the image photographing/reproducing system according to the second embodiment of the present invention.

The image photographing/reproducing system 2 shown in FIG. 7 is constructed similarly to the image photographing/reproducing system 1 shown in FIG. 1 except that the construction (communication function) of an IC chip of a lens-fitted photographic film package is different from that in the image photographing/reproducing system 1 and that the image photographing/reproducing system 2 includes a center computer 130. Thus, the same reference numerals as used in FIG. 1 are used in FIG. 7 to denote the same components, and the detailed description thereof is omitted.

The image photographing/reproducing system 2 shown in FIG. 7 includes a lens-fitted photographic film package 110, an image reproducing apparatus 30, a database 32, and the center computer 130, wherein the lens-fitted photographic film package 110 can transmit and receive data to and from gates 120 installed in a predetermined region such as a theme park and the like, the image reproducing apparatus 30 reproduces the images of the photographed lens-fitted photographic film package 110 and outputs reproduced images; the database 32 is connected to the image reproducing apparatus 30 and acquires composite data which is combined with the reproduced imaged or recorded in association with the reproduced images; and the center computer 130 is connected to the gates 120 and the image reproducing apparatus 30 and records and manages the identification information and the like such as identification (ID) codes and the like transmitted from the lens-fitted photographic film package 110 and the gate information of the gates 120.

Figure 2B:
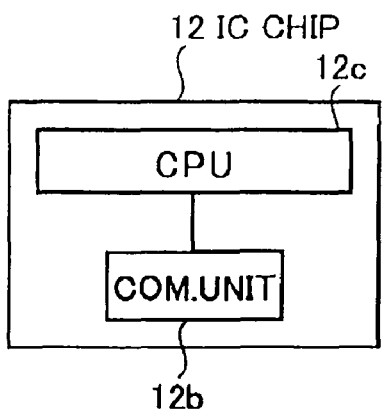
FIG. 2B is a block diagram of another embodiment of the IC chip of the lens-fitted photographic film package.

An IC chip 112 is provided with the lens-fitted photographic film package 110 of the illustrated example. While it is sufficient to use an IC chip constructed similarly to the IC chip 12 shown in FIG. 2A and including an IC memory 12a, a communication unit 12b, and a CPU 12c as the IC chip 112, the CPU 12c must have a transmitting function or a receiving function in this embodiment. However, when the IC chip 112 transmits and receives data to and from gates 120 each time the lens-fitted photographic film package 110 records an image, an IC chip 112 having the communication unit 12b and the CPU 12c may be used as shown in FIG. 2B. Note that the lens-fitted photographic film package 110 is constructed similarly to the lens-fitted photographic film package 10 except that it includes the IC chip 112 in place of the IC chip 12.

Further, while the gate 120 also includes a communication unit 122, the gate 120 is constructed similarly to the gate 20 except that the communication unit 122 receives photographed frame information such as photographed frame numbers and the like together with film identification information such as a lens-fitted photographic film package identification (ID) code and the like from the lens-fitted photographic film package 110 and transmits them to the center computer 130.

It should be noted that when the image reproducing apparatus 30 shown in FIG. 6 is used in the image photographing/reproducing system 2, an IC reader 46 acquires the photographed frame numbers, the gate information, and the like from the center computer 130 connected to the gate 120 using the identification code, and the like of the lens-fitted photographic film package 110 in place of that the IC reader 46 reads out the photographed frame numbers, the gate information, and the like from the IC memory 12a of the IC chip 112 of the lens-fitted photographic film package 110.

That is, the image photographing/reproducing system 2 of the second embodiment transmits the data (information) such as the identification cede, photographed frame numbers, and the like of the lens-fitted photographic film package 110 from the IC chip 112 mounted on the lens-fitted photographic film package 110 to the gates 120 through the communication unit 12b, inversely to the above-mentioned image photographing/reproducing system 1 of the first embodiment. Each gate 120 receives the information and data through the communication unit 122, adds the gate information to the received information and data, and transmits the resulting information to the center computer 130 connected to each gate 120. The center computer 130 records and summarizes the photographed frame numbers, and the gate information and the like corresponding to photographed frame numbers for each identification code and manages them. It should be noted that while the IC chip 112 of the lens-fitted photographic film package 110 may transmit the information to a gate 120 through the communication unit 12b each time photographing is executed, when the IC chip 112 includes the IC memory 12a, each gate 120 may read information stored after communication is executed to a gate 120 through which a customer passed last time or may receive the information stored in the IC memory 12a from the communication unit 12b.

When the customer takes a picture in a predetermined region such as a theme park and the like and directs the lens-fitted photographic film package 110 toward a gate 120 when he or her passes through the gate 120, the gate 120 receives the information and data transmitted from the communication unit 12b of the IC chip 112 through the communication unit 122 thereof each time the lens-fitted photographic film package 110 is directed toward the gate 120. Then, the gate 120 reads out the information and data, which have been stored in the IC memory 12a of the lens-fitted photographic film package 110 after the information and data was read out by the previous gate 120 which the customer passed last time, from the IC memory 12a, adds the gate identification information, and the like of the present gate 120 to the frames photographed during a period from the time the customer passed through the previous gate to the time he or she passes through the present gate 120, and transmits the gate identification information, and the like to the center computer 130. Then, the information and data are written to an internal or external database, and the like. The center computer 130 records and summarizes the data of respective photographed frames for each customer or the identification code of each lens-fitted photographic film package 10 for management so that the information and data can be utilized when the customer requests to output reproduced images as prints and the like later.

Thereafter, the lens-fitted photographic film package 110 of the image reproducing apparatus 30 executes reproduced image output processing such as print creating processing and the like similarly to that executed by the above-mentioned first embodiment except that the IC reader 46 of the image reproducing apparatus 30 acquires the photographed frame numbers, the gate information, and the like using the identification code and the like.

In the second embodiment, however, the information as to the respective photographed frames is stored in and recorded by the center computer 130. Accordingly, when an image recorded on each frame is reproduced and output as a print, the information and data of each photographed frame is read out from the center computer 130 based on each identification code and information of a photographed frame number, a composite print P is created based on the information, and an image data recording medium M in which the composite image data is recorded is outputted or the composite image data is distributed through a communication network N.

Note that similar processing can be executed by reading a barcode attached to the housing of the lens-fitted photographic film package 110 without providing the IC chip 112 with the lens-fitted photographic film package 110.

That is, when the barcode attached to the lens-fitted photographic film package 110 is read by each gate through which the customer passes, the information such as the identification code, and the like is recorded in the center computer 130. With this arrangement, a path along which a customer walked in a theme park can be determined, which can present a map of the theme park on which the path the customer passed, and the like are printed to the customer as a service as in the first embodiment. However, since a photographed frame cannot be specified only by reading the barcode, the contents of composite processing made to each frame is limited as compared with those of the first embodiment. However, since the information as to the gates passed by the customer is available, the above drawback of the second embodiment can be overcome in some degree by appropriately combining characters relating to the theme pavilions (theme areas) the customer passed with the photographed images in the sequence of the path the customer walked.

Next, the image photographing/reproducing system of the third embodiment of the present invention will be explained.

The image photographing/reproducing system of the third embodiment exhibits a similar effect by mounting an IC chip 12 on the Patrone 18a of a photographic film 17a of a conventional film camera 11a as shown in FIG. 4A in place of the lens-fitted photographic film packages 10 and 110 shown in FIGS. 1 and 6.

In this system, the following two cases are available: in one case, the information from a gate 20 is recorded in the IC chip 12 of the Patrone 18a, and when reproduced images are outputted as prints and the like, images and the like are combined with the information read out from the IC chip 12 as in the above-mentioned image photographing/reproducing system 1 of the first embodiment; and in the other cases the data transmitted from the IC chip 12 of the Patrone 18a is received by a gate 20 so that photographed information is managed by a center computer 130, and images are combined based on the managed information when reproduced images are outputted as prints and the like as in the above-mentioned image photographing/reproducing system 2 of the second embodiment.

Further, when data is recorded in the IC chip 12, there are a case in which the IC chip 12 has a recording function by itself, and case in which the camera 11a receives data from a gate 20 and records the data in the IC chip 12.

The third embodiment is similar to the above first and second embodiment except that the IC chip 12 is mounted on the housing of the lens-fitted photographic film packages 10 and 110 in the first and second embodiments, whereas it is mounted on on the Patrone 18a of the photographic film 17a in the third embodiment. That is, the IC chip 12 is mounted on a photographing medium, that is, a photographic film and an image memory medium which are delivered to and from a laboratory, and photographed information is recorded in the photographing medium and used when reproduced images are outputted as prints.

Note that when an APS (Advanced Photo System) includes a communication unit having a receiving function on a camera side, the gate information received from a gate 20 may be magnetically recorded on the magnetic layer of an APS film in place of the IC chip 12.

Note that, in the above respective embodiments, when the information and data are recorded in the IC chip, image data itself which is combined when reproduced images are output as prints may be also included as gate information to be recorded, in addition to gate identification information indicating photographed places.

Further, while only images or documents (messages) are combined in the above embodiments, a fourth embodiment not only combines images, and the like but also treat audio data to more increase an amusement property in photographing.

In the fourth embodiment, an IC chip 12 or 112 is mounted in the housing of the lens-fitted photographic film package 10 or 110 as shown in FIG. 1 or FIG. 7, on the Patrone 18a of the photographic film 17a of the ordinary camera 11a as shown in FIG. 4, or on the image memory medium 17b of the digital camera 11b as shown in FIG. 5, and further a small speaker 19 is mounted on the lens-fitted photographic film package 10 or 110 or on the bodies of the cameras 11a and 11b. Various reproducing data is recorded in the IC memory 12a (refer to FIG. 2A) of the IC chip 12 and 112. The data is preferably arranged as data which is different for each frame. The data may be previously inputted in batch processing when a customer enters a theme park. Otherwise, each time the customer passes through a gate 20 or 120, only data which corresponds to a theme area 24 (refer to FIG. 3) where the gate 20 or 120 is installed may be inputted to the IC chip 12 or 112 from a communication unit 22 or 122, which has a transmission function, of the gate 20 or 120.

The music of a theme song and the like of the theme park and the voice data of a character and a famous talent are contemplated as the contents of the data. Otherwise, a service for inputting data brought by a customer may be executed in a store.

The data recorded in the above-mentioned IC chip 12 or 112 is reproduced and outputted from the accompanying speaker 19 at a timing when a customer winds up a film to take a picture or depresses a specific button in the theme park. With this arrangement, the lens-fitted photographic film packages 10 and 110, and the cameras 11a and 11b also have a feature as playing gears having a high degree of the amusement property, in addition to that they are simply photographing apparatuses.

Further, the score and the song of music corresponding to each frame may be back printed. These arrangements can greatly increase the amusement property in photographing.

Further, since the IC chip is mounted on the lens-fitted photographic film package or on the Patrone of the photographic film, it can be contemplated to use the lens-fitted photographic film package or a camera on which the Patrone having the IC chip is loaded in place of a card as described below, in addition to the above embodiments.

That is, the customer shows the lens-fitted photographic film package with the IC chip or the like each time he or she makes a purchase in a theme park so that purchase information is recorded in the IC chip provided with the lens-fitted photographic film package and the like. Then, the customer shows the lens-fitted photographic film package or the like at a final gate and makes payments to the purchases he or she made in the theme park based on the purchase information recorded in the IC chip. Thereafter, the customer places an order for prints. At that time, images, documents, and the like according to the purchasing may be back printed. For example, a commercial message, a gift ticket, and the like or shopping information summarized like a household account book are back printed. The commercial message is used as an advertisement of a firm, and the gift ticket is used by the customer to get a gift when he or she visits the theme park again. Further, the household-account-book-like shopping information makes a picture more interesting by indicating the background of the age when the customer visited the theme park through the prices and the like in those days, when, for example, the customer reviewed the picture in later years. These arrangements can greatly increase the amusement property of pictures.

Note that a customer must place an order for reproduced images as prints and the like in a theme park as a general rule in the above-mentioned embodiments. However, when it is difficult for the customer to place the order in the theme park due to some circumstances, he or she can place the order with a laboratory or the like externally of the theme park which is in business association with the theme park.

In the image photographing/reproducing system of the present invention, the hardware arrangements, which realize the photographing function of a camera, the communicating function between the camera and a gate and a communication point in a predetermined region such as a theme park and the like, and the image reproducing function, are not limited to the examples described above, and various patterns of the hardware arrangements may be used as shown below.

First, while the communicating function, that is, the IC chip having the communication unit 12b is provided with the lens-fitted photographic film package, the ordinary photographic film and the image memory medium in the above-mentioned examples, the present invention is not limited thereto. That is, the communication function itself may be provided with a camera independently of the IC chip, and the IC chip may be provided with only a function as an IC memory. Further, in a digital camera, various information may be written to the image memory medium 17b together with photographed image data without providing even the IC chip with the camera.

Incidentally, when a photographing apparatus is arranged as a digital camera with a radio communication function as a first modified embodiment, the frame numbers of photographed images/file names of the image data of the photographed images, and gate information (including gate ID) received from a gate passed by a customer may be recorded in an IC chip or an image memory medium in association with each other, as in the example shown in FIG. 1 in which the lens-fitted photographic film package is replaced with the digital camera.

Further, the customer identification code (hereinafter, referred to as customer ID) set to a camera and the frame numbers/file names of photographed images may be transmitted to a gate passed by the customer and recorded in and managed by a center computer (database or server, hereinafter, referred to as center server) in association with gate information, as shown in the example of FIG. 7 in which the lens-fitted photographic film package is replaced with the digital camera with the radio communication function. In this case, a memory medium identification code (hereinafter, referred to as medium ID) allocated to an image memory medium may be used in place of the customer ID.

Note that, in the first modified embodiment, it is sufficient to check a photographed image (image data) against a gate passed by a customer as described above.

As a second modified embodiment, time information may be used in place of the frame numbers/file names of the photographed images in the first modified embodiment.

That is, in a first case in which information is transmitted from a gate to a camera (refer to FIG. 1), photographed time data is added to photographed image data, and received time information (camera side time data) or gate side time data is added to the gate information in addition a gate identification code (hereinafter, referred to as gate ID).

In contrast, in a second case in which information is transmitted from a camera to a gate and further recorded in and managed by the center server (refer to FIG. 7), photographed time data is added to photographed image data, and camera side data is transmitted to a gate passed by a customer together with customer ID/medium ID. Then, the center server record the above data together with gate information. Otherwise, only the customer ID/medium ID is transmitted to the passed gate and added to the gate side time data. Further, the resultant data is added to gate data and recorded in the center server.

As a third modified embodiment, when a camera is provided with a watch function while it is not provided with a communication function, a customer carries a card with a communication function, for example, a card with an IC chip. At that time, a theme park and the like, for example, distribute the card with the communication function as an admission ticket.

That is, in the above first case (refer to FIG. 1), it is sufficient to provide a small amount of memory function with the card with the communication function and to record a gate ID and time data in the card as one set. Further, in the above second case (refer to FIG. 7), when a customer passes through a gate, communication is executed between the card and the gate, and a communication time and a card identification code (hereinafter, referred to as card ID) is recorded on the gate side (in the center server).

When a customer places an order for reproduced images as prints with a laboratory, he or she delivers the card to the laboratory together with a lens-fitted photographic film package or an image recording medium such as a photographic film, an image memory medium or the like.

The laboratory, (image reproducing apparatus) can relate photographed images to gate information based on a card ID, photographed time data, and gate passed time data.

When a camera is provided with a monitor as described later (for example, digital camera) as a fourth modified embodiment, the image data of sample characters is received by the camera from a gate and displayed on the monitor in the first case (refer to FIG. 1). A customer selects an image he or she desires to combine with a photographed image from the images displayed on the monitor and records the identification number of the selected image in association with a photographed frame number. Further, it is preferable also to add edit data for designating a position where the selected image is combined and a size of the selected image When composite processing is executed in the laboratory (image reproducing apparatus), it is preferable to combine the image itself of the character received by the camera or the image of high resolution of the character.

In the fourth modified embodiment, when a service for recording image data to an image data recording medium M, for example, to a CD-R and the like or a service for transferring (delivering) the image data through a network, it is possible to combine at least any one of image (still image/moving image) data, document (text) data, audio data, and program data as composite data to be combined.

In the fourth modified embodiment, an image memory medium (for digital camera), in which predetermined reproducing data and program (used for communication and data reproduction) are recorded, is previously distributed to customers. It is preferable that a specific program or data be reproduced to a customer who carries a digital camera, on which the image memory medium is mounted, in accordance with a gate passed by him or her or a communication point.

It should be noted that the program data to be combined may be a simple game soft. The simple game soft may be implemented on a digital camera or upon reproduction from a recording medium. Examples of the game soft include a soft for changing the photographed image to the form of a jigsaw puzzle, game softs which are different from each other in the respective gates and in which the characters relating to the respective pass gates appear, and a single type of game soft in which the game scenes applied to the gates are different from each other.

Further, the program data may be a soft for reproducing the composite image/document/audio or a GUI soft for order reception.

When a digital camera has a high degree of transmission function as a fifth modified embodiment (a second case referring to FIG. 7), the compressed image data of photographed images or an image characteristic amount can be transmitted to a gate. The gate having received the compressed image data or the image characteristic amount can record and store it in a center server in correspondence to gate information.

When reproduced images as prints are ordered, a laboratory (image reproducing apparatus) combines an image according to a gate with original image data.

Note that transmission of a customer ID from the camera is not essential here. In this case, an image can be identified by a file name of the image. However, when a plurality of files having the same file name exist, an image can be identified by any of i) comparison of a degree of similarity of compressed data between an original image and an image stored in the center server, ii) comparison of a degree of similarity of image characteristic amounts therebetween, and iii) comparison of a photographed time with received time.

When a digital camera has a high degree of transmission function likewise as a sixth modified embodiment (the second case referring to FIG. 7), the original image data itself of photographed images can be transmitted to a gate. A gate having received the original image data records and stores the image data in a center server in association with gate information. Then, a laboratory (image reproducing apparatus) combines an image according to a gate with the original image data.

Note that it is more preferable in this case that reproduced images as prints and the like have been finished when a customer reaches a laboratory (photo shop and the like).

Transmission of a customer ID from a camera is not essential also in this case similarly to the fifth modified embodiment (while it is convenient to transmit it).

In the fifth and sixth modified embodiments, it should be noted that a card ID may be utilized by the use of a card with a communication function and memory function independently of data transmission executed by the camera, similarly to the third modified embodiment.

The image photographing/reproducing system and method, the photographing apparatus and the image reproducing apparatus as well as the image reproducing method according to the first to fifth aspects of the present invention are basically constructed as described above.

Next, a photographing apparatus according to a sixth aspect of the present invention will be explained with reference to FIGS. 8 to 11.

A camera with a display screen as the photographing apparatus of the present invention will be explained in detail based on a preferred embodiment shown in accompanying drawings.

Figure 8A:
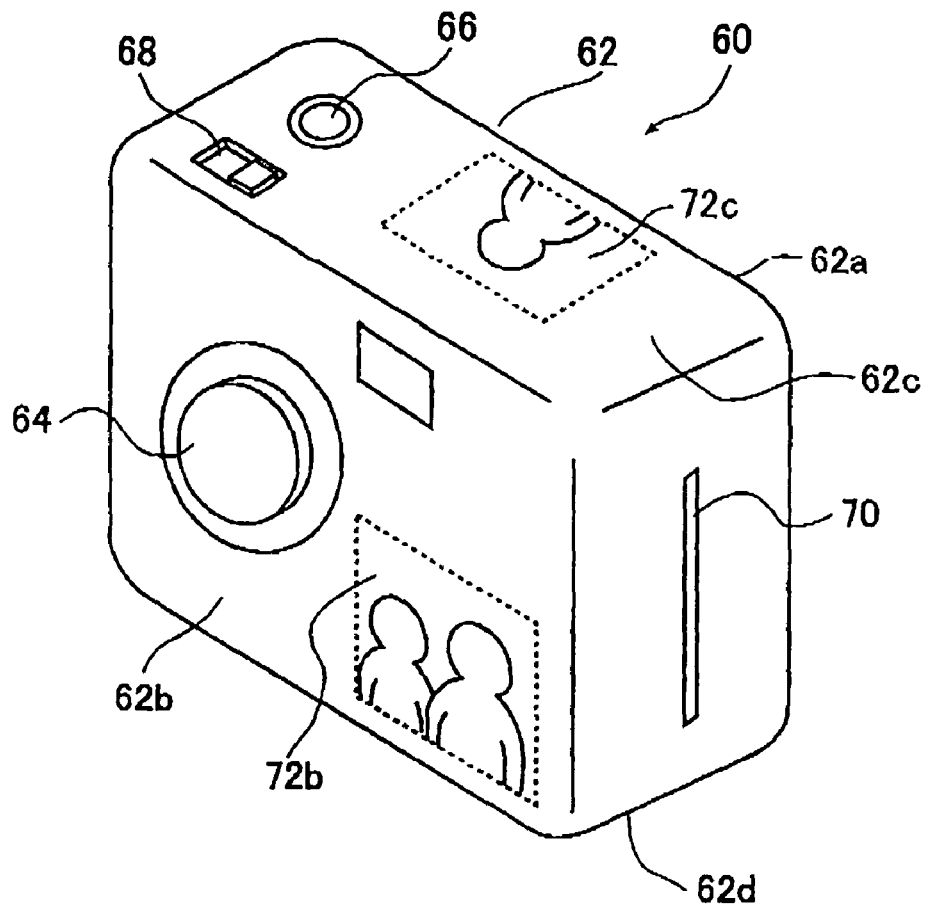
FIG. 8A is a schematic perspective view showing an embodiment of a camera with a display screen acting as a photographing apparatus of the present invention.

FIG. 8A shows a schematic perspective view of a digital still camera with a display screen 60 (hereinafter, simply referred to as a camera) as the embodiment of the camera with the display screen of the present invention.

As shown in FIG. 8A, on an exterior of the camera 60, a photographing unit 64 is disposed on a front surface 62b of a camera housing 62; a release button 66 and a power switch 68 are disposed on an upper surface 62c of the camera housing 62; a memory card insertion slot 70 is disposed on one side surface of the camera housing 62; and further a plurality of image display subsections, that is, image display subsections 72a, 72b, 72c, and 72d (hereinafter they are referred to as an image display section 72 as a whole) are disposed on a back surface 62a, the front surface 62b, the upper surface 62c, and a bottom surface 62d of the camera housing 62.

Figure 9A:
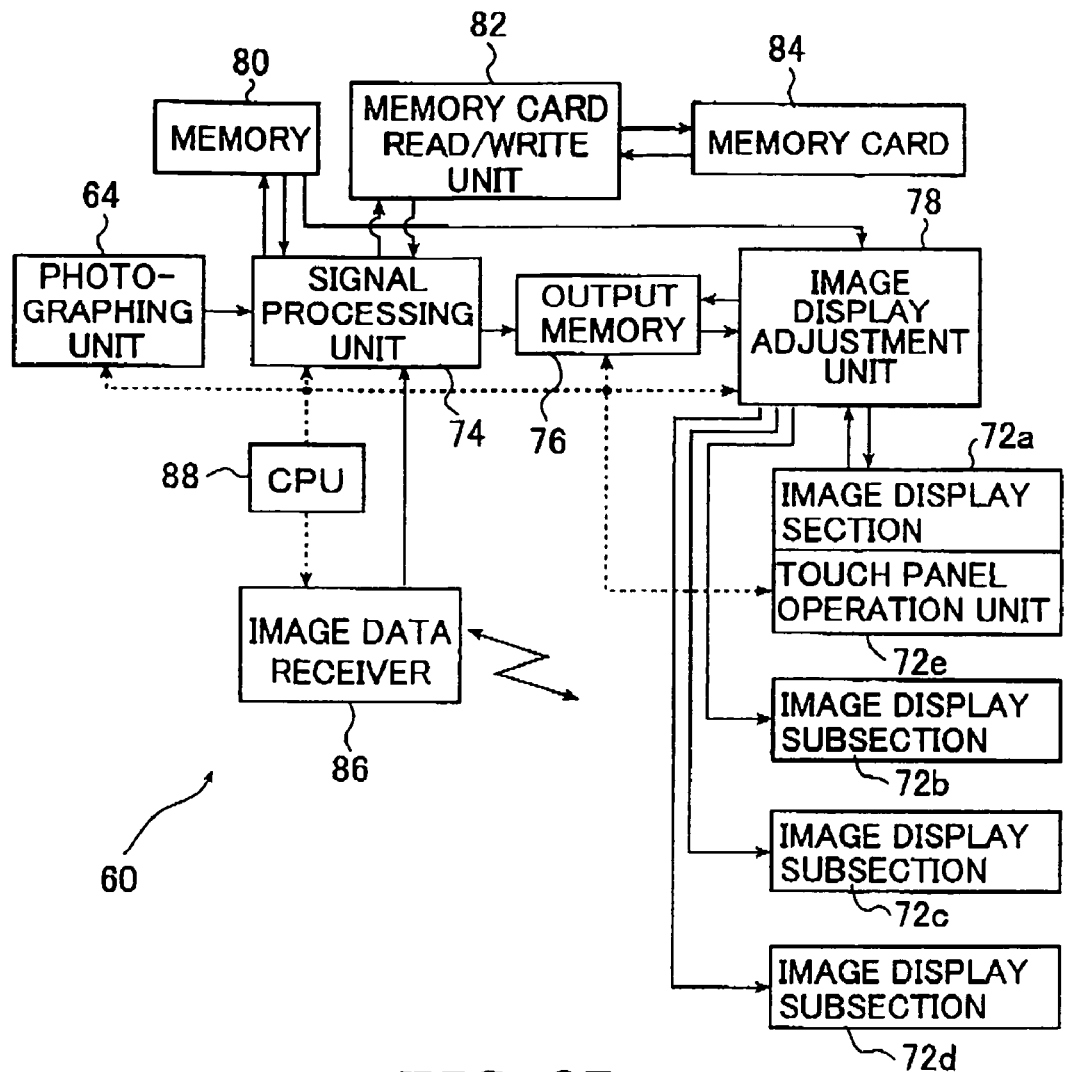
FIG. 9A is a block diagram showing construction of an embodiment of the camera with the display screen shown in FIG. 8.
Figure 9B:
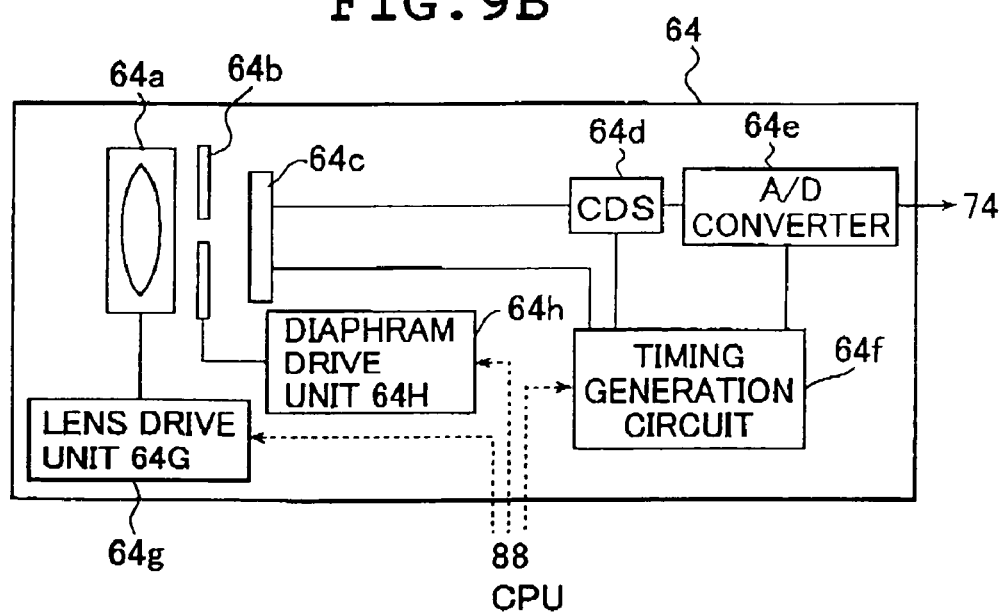
FIG. 9B is a block diagram showing construction of an embodiment of an image pick-up unit of the camera with the display screen shown in FIG. 9A.
Figure 10:
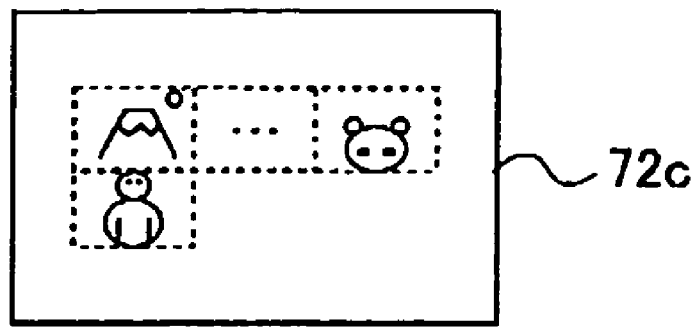
FIG. 10 is a view showing another example of the display screen displayed on the image display section of the camera with the display screen shown in FIG. 8.

FIG. 9A shows an inner construction of the camera 60 having the exterior as described above. As shown in FIG. 9A, the camera 60 mainly includes the photographing unit 64, a signal processing unit 74, an output memory 76, an image display adjustment unit 78, the image display section 72, a touch panel operation unit 72e, a data recording unit 80, a memory card read/write unit 82, and an image data receiving unit 86, wherein the photographing unit 64 takes a picture of an image by photoelectrically reading it and acquires image data; the signal processing unit 74 subjects the image data acquired by the photographing unit 64 to predetermined signal processing; the output memory 76 temporarily stores and record the image data having been subjected to the signal processing; the image display adjustment unit 78 adjusts the disposition of the images to be displayed on the image display section 72 (image display subsections 72a to 72d); the touch panel operation unit 72e is disposed on the surface of the image display subsection 72a; the data recording unit 80 includes a memory for recording and storing image data; the memory card read/write unit 82 reads image data recorded in a memory card 84 or writes image data to the memory card 84; and the image data receiving unit 86 receives image data using radio methods. The camera 60 further includes a CPU 88 for managing and controlling the operation of the photographing unit 64, the signal processing unit 74, the output memory 76, the image display adjustment unit 78, the touch panel operation unit 72e, the image data receiving unit 86 and the like.

The photographing unit 64 is composed of a known photographing mechanism. As shown, for example, in FIG. 9B, the photographing unit 64 includes a photographing lens 64a, a diaphragm 64b, a CCD (image pick-up element) 64c, a CDS circuit 64d, an A/D converter 64e, a timing generation circuit 64f, a lens drive unit 64g, and a diaphragm drive unit 64h.

The photographing lens 64a is a zoom lens composed of a plurality of lenses and driven by a drive force from the lens drive unit 64g so as to execute zooming operation as well as a focus lens is moved by an AF mechanism which will be described later.

The diaphragm 64b is a device for changing a size of an aperture by moving, for example, diaphragm plates, by which the aperture is defined, by a drive force from the diaphragm drive unit 64h.

An image of a subject, which has been formed on the light receiving surface of the CCD 64c through the photographing lens 64a, is photoelectrically converted by the CCD 64c, and image signals are sequentially read out. The noise of the respective pixels of the image signals read out from the CCD 64c is suppressed by the CDS circuit (double sampling circuit) 64d, and the image signals are amplified by a gain control amplifier (not shown). Thereafter, the image signals are converted into R, G, and B digital image data and sent to the signal processing unit 74.

A timing signal is applied to the CCD 64c, the CDS circuit 64d, and the A/D converter 64e of the photographing unit 64 from the timing generation circuit 64f controlled by the CPU 88, and the respective circuits are synchronized with each other in response to the timing signal.

Further, the timing generation circuit 64f and the drive units 64g and 64h are connected to the CPU 88 so that they receive operation commands therefrom and are controlled thereby.

The signal processing unit 74 executes known digital image processing such as color (gray) transformation and correction, gradation correction, density (brightness) correction, saturation correction and compression/expansion of the dynamic range of densities, and further magnification conversion, and the like, in addition to known data processing such as damage/defect correction, γ correction, darkness correction, and the like, in accordance with the contents of designation and setting performed by the touch panel operation unit 72e which will be described later.

The image data having been subjected to the signal processing by the signal processing unit 74 is recorded in the built-in data recording unit 80 (for example, a flush memory built in a camera) or in the detachable memory card 84, for example, a PC card or the like through the memory card read/write unit 82.

The output memory 76 temporarily records and stores the image data sent from the signal processing unit 74, and the thus recorded and stored image data is captured from the image display adjustment unit 78.

When the image data is displayed on the image display subsections 72a to 72d which will be described later, the image display adjustment unit 78 adjusts the disposition of images in accordance with a display method designated by the touch panel operation unit 72e disposed on the image display subsection 72a so that the images can be displayed on the predetermined image display section 72.

The image display section 72 is composed of the image display subsections 72a to 72d each formed of an image display medium composed of an approximately-sheet-like electron paper acting as a sheet-like image display device, different from a conventionally used liquid crystal display device.

The electron paper is the electric paper disclosed in Japanese Unexamined Patent Application Publication No. 11-316397, the electron paper shown in the magazine "ASCII", pages 220-225, February 2000 and pages 242-247, March 2000, or an approximately-sheet-like film liquid crystal using ferroelectric liquid crystal. That is, the electron paper is a reflective type image display medium which permits an image to be viewed through reflected external light similarly to a so-called printed matter.

In the embodiment, while the image display section 72 is formed on the back, front, upper and bottom surfaces 62a, 62b, 62c, and 62d of the camera housing 62, it may be also formed on the side surfaces thereof. That is, the image display section 72 may be formed on any portions of the exterior of the camera housing 62 so long as it can be formed thereon.

A reason why the camera 60 can be provided with the plurality of image display sections composed of the electronic papers is that they have an advantage of consuming power in an amount smaller than that consumed by the conventional liquid crystal display because an image displayed once by the application of an electric field to an electronic paper can be maintained without vanishing out of sight until a next electric field is applied thereto.

Further, the electronic paper can be used at a low cost because it is not an expensive product of bad yield such as a liquid crystal monitor. Further, the electronic paper is advantageous in that it is light in weight as compared with the liquid crystal monitor and further can display a series of pictures on the back, side and front surfaces of the a camera hosing depending upon a method of disposing the image display section.

The touch panel operation unit 72e is a portion having a touch panel disposed on the upper surface of the image display subsection 72a which is disposed on the back surface 62a of the camera housing 62.

The touch panel operation unit 72e senses a pressure applied on the surface of the touch panel by an input touch pen, a finger and the like and outputs an output signal indicating a touched position to the image display adjustment unit 78. Output signals as to designation of an image to be displayed and as to designation of an image display section and an output signal as to settings and the like of various parameters of the camera 60 are sent to the image display adjustment unit 78, and the designated or set contents are determined from the output signals. With this operation, the output signals can designate and set various parameters of the camera 60, for example, can designate conditions in photographing such as a zooming magnification of the photographing lens 64a, a stop value of the diaphragm 64b, and the like, designate image processing conditions in the signal processing unit 74, set deletion of image data from the data recording unit 80, and set a date and time, in accordance with touch positions. In addition to the above, the output signals can make designation so that a desired image and a desired screen can be displayed on a desired subsection of the image display section 72.

Figure 8B:
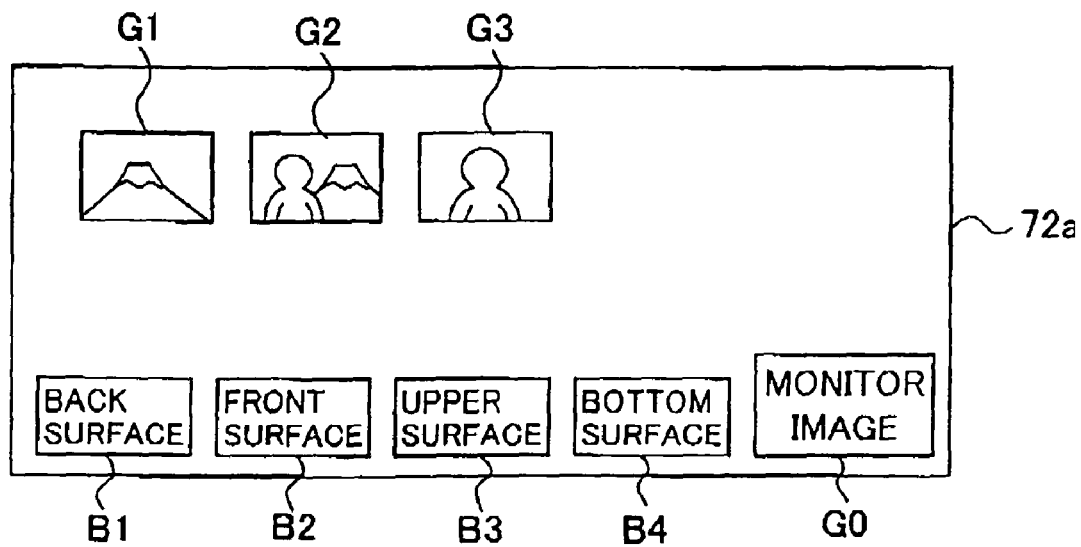
FIG. 8B is a view showing an example of an operation setting screen displayed on an image display section of the camera with the display screen shown in FIG. 8A.

For example, the image display subsection 72a shown in FIG. 8B shows a disposition adjustment screen which is one of operation setting screens for adjusting the disposition of images on the image display section 72. The reduced display images of photographed images G1 to G3 are displayed on the disposition adjustment screen. The photographed image G3, for example, can be designated by pressing a region where it is displayed on the disposition adjustment screen; the image G3 can be displayed on the image display subsection 72c by pressing an "upper surface" button B3 among designation buttons disposed at a lower portion of the disposition adjustment screen; further, a monitor image, which is now being photographed by the camera, can be displayed on the image display subsection 72b on the front surface of the camera housing 62 by designating a "monitor image" G0 through depression thereof as well as by pressing a "front surface" button B2.

Any desired image can be disposed on the image display section 72 by the adjustment operation described above. For example, a person to be photographed can observe himself or herself by displaying his or her monitor image on the image display subsection 72b located on the front surface of the camera housing 62. Thus, when a photographer takes a picture of himself or herself or a picture in which he or she and another person stand side by side, the photographer can take the pictures in a desired pose or in a desired composition. Further, the monitor image can be displayed on the image display subsection 72c disposed on the upper surface 62c of the camera housing 62 by designating the "monitor image" G0 and pressing the "upper surface" button B3. Thus, even if the camera 60 is set at a low position, the photographer can observe the monitor image displayed on the image display subsection 72c, which prevents the photographer from looking through a finer while maintaining an unnatural attitude.

Further, when the monitor image is displayed on the image display subsections 72a to 72d, a direction in which the monitor image is displayed on the image display subsections 72a to 72d may be changed in accordance with an attitude of the camera 60 by detecting the attitude thereof using a known attitude detecting technology making use of an attitude sensor built in the camera 60. For example, when the camera 60 is set with the side surfaces facing in an up and down direction, the monitor image may be displayed with the top and bottom direction thereof in agreement with an actual top and bottom direction by turning the monitor image to be displayed on the image display subsection 72b right or left by 90° and standing it.

The image display section 72 includes a plurality of image display surfaces such as the image display subsections 72a to 72d as described above. Accordingly, it is not necessary to display a monitor image and a photographed image by reducing their size as in a conventional single liquid crystal monitor, and an image can be displayed at a desired position in a large size with the top and bottom direction of the image in agreement with an actual top and bottom direction, whereby an image can be easily and promptly confirmed.

Further, the image display adjustment unit 78 can capture the image data of an operation explanation screen and an operation setting screen, which is previously prepared by being recorded in the data recording unit 80, and optionally display the screens on any desired one of the image display subsections 72a to 72d, and further can display the operation explanation screen in an enlarged or reduced size. That is, the image display adjustment unit 78, which acts as an image acquiring means of the present invention, captures the image data of a display screen to be displayed on the image display subsections 72a to 72d from the data recording unit 80, subjects the image data to enlargement or reduction processing in the signal processing unit 74 when necessary, and displays the operation setting screen or the operation explanation screen on the image display subsections 72a to 72d. Contents designated or set by the output signals, which are outputted by pressing the touch panel operation unit 72e with the input touch pen or a finger and transmitted, are determined by the image display adjustment unit 78.

While the touch panel operation unit 72e is disposed only to the image display subsection 72a in the embodiment, it may be also disposed to the front and upper surfaces 62b and 62c, and the like of the camera housing 62 so that displayed image can be adjusted and the various parameters of the camera 60 can be set and designated using the disposition adjustment screen and the operation setting screen displayed on the image display sections 72b and 72c. In this case, outputs signals acquired by the plurality of touch panel operation units disposed on the image display section 72 are sent to the image display adjustment unit 78, and the contents designated or set by the output signals are integrated and determined. With this operation, the various parameters of the camera 60 can be designated and set also from the image display subsections 72b, 73c, and 73d in addition to the image display subsection 72a. As a result, the operability of an input operation, which is conventionally carried out using a single display screen to designate and set the various parameters, can be improved.

Further, as pictures are taken one after another, the image display adjustment unit 78 may sequentially add photographed images on the image display subsections 72a to 72d in a reduced size and display them thereon. For example, a monitor image is displayed on the image display subsection 72a, and photographed and reduced images are sequentially added to and displayed on the image display subsections 72a, 72c, and 72d as they are photographed, wherein when the image display subsection 72b is full with a photographed image, the display place of the photographed image is changed to the image display subsection 72c, and when the image display subsection 72c becomes full, the display place thereof is changed to the image display subsection 72d. With this operation, the outline of the contents and number of photographed images can be found.

Further, the image display adjustment unit 78 may capture an image previously registered in the data recording unit 80 in accordance with setting on the operation setting screen and displays the image on a predetermined subsection of the image display section 72, and further it is preferable to display a moving image at the time.

For example, when a subject to be photographed does not pay attention to the camera 60 as in a case of an infant and a picture of an image having a desired composition cannot be taken, a character of a specific popular animation is displayed or reproduced on the image display subsection 72b disposed on the front surface 62b of the camera housing 62 in order to attract the interest of the subject in the direction of the camera 60 so that a picture of the image having the desired composition can be taken. Further, when a picture is taken using a timer, a countdown state of the timer may be displayed on the image display subsection 72b. As described above, various display modes can be set by the use of the touch panel operation unit 72e and the operation setting screen.

The image data receiving unit 86 is a known receiving unit for receiving image data transferred from the outside and is not particularly limited in the present invention so long as it can receive image data.

The camera 60 of the sixth aspect of the present invention is constructed as described above.

In the camera 60, an image to be photographed is first photoelectrically read by the CCD 64c of the photographing unit 64. Then, the image data of the image is acquired through the CDS circuit 64d and the A/D converter 64e, transmitted to the signal processing unit 74, and subjected to predetermined image processing. Thereafter, the image data having subjected to the image processing is sent to the output memory 76 as well as to the data recording unit 80. The is having been sent to the output memory 76 is recorded and stored therein as well as invoked by the image display adjustment unit 78 and displayed on the image display section 72.

While the photographed image is displayed on the designated image display section 72, a desired image can be displayed by selecting the image data of the image to be displayed on the image display section 72 from the image data recorded and stored in the data recording unit 80. That is, when the image data of the image which is desired to be displayed on the image display section 72 is designated from the touch panel operation unit 72e, the designated image data is captured from the data recording unit 80, subjected to signal processing in the signal processing unit 74 when necessary and recorded and stored in the output memory 76. Thereafter, the image is displayed on a designated subsection of the image display section 72 according to a display format designated by the touch panel operation unit 72e. Further, image data is captured from the memory card 84 through the memory card read/write unit 82 according to a designated content and used to display an image. Otherwise, the image data of a displayed image is recorded in the memory card 84.

As described above, the image data of the image displayed on the image display subsection 72a to 72d may be the image data having been read through the memory card read/write unit 82 and recorded in the memory card 84 or the image data having been received by the image data receiving unit 86 using radio methods. In this case, it is preferable to display an image on the image display section 72 at a predetermined timing using image data having been acquired. An image data supplier from which the image data is acquired is previously set by the touch panel operation unit 72e.

Image data transmitted in a theme park is exemplified as an example of the image data received by the image data receiving unit 86 using the radio methods.

A gate is installed at the entrance of each theme pavilion or theme area in a theme park and transmits image data. In contrast, the camera 60 sets an image data supplier to the image data receiving unit 86, and each time a customer carrying the camera 60 passes through the gate installed at the entrance of each theme pavilion or theme area, the camera 60 receives the image data transmitted from the gate.

The image data having been received by the image data receiving unit 86 is sent to the signal processing unit 74 and subjected to the signal processing therein when necessary. Thereafter, the image data is sent to and recorded in the data recording unit 80 as well as sent to the output memory 76 and temporarily recorded and stored therein. Further, the image data is captured by the image display adjustment unit 78 and the image of the image data is displayed on a designated subsection of the image display section 72 at the predetermined timing. Each time the customer passes through a gate of a theme pavilion or a theme area, the camera 60 displays an image according to the theme pavilion or the theme area at a desired position on the exterior thereof, which can improve the amusement property of the camera itself. An image displayed once on the electronic paper that forms the image display section 72 by applying an electric field to the electronic paper as described above is maintained without vanishing out of sight until a next electric field is applied thereto. Thus, the electronic paper is suitable for displaying an image for a predetermined period and further needs no power consumption.

Figure 11:
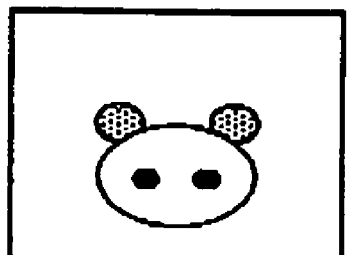
FIG. 11 is a view showing an example of change of an image displayed on the image display section of the camera with the display screen shown in FIG. 8.
Figure 11:
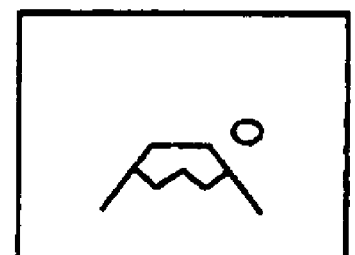

As described above, each time the customer passes through the gate installed at the entrance of each theme pavilion or theme area, an image being displayed is changed. Note that FIG. 11 shows an example that an image being displayed on the image display subsection 72c is changed while the customer walks from a theme area "A" to a theme area "B". A character relating to a theme pavilion or a theme area, an illustration and a sentence explaining the theme pavilion or the theme area, and an image for advertisement and publicity, and the like, for example, are exemplified as the image to be displayed. Further, the image acquired using the radio methods is not necessarily displayed on the same subsection of the image display section 72, but a place in the image display section 72 where the image is displayed may be automatically changed, for example, from the image display subsection 72b to the image display subsection 72c each time image data is received.

It is needless to say that the image data having been received by the image data receiving unit 86 and the displayed as an image may be recorded in the memory card 84 through the memory card read/write unit 82.

Further, a lens-fitted photographic film package with a built-in IC and an ordinary camera may display an image as described above, in addition to the digital still camera.

That is, an image display section similar to the image display section 72 composed of the electronic paper may be disposed on the exterior of the housing of the lens-fitted photographic film package with the built-in IC or the ordinary camera, and further an image data receiving unit, a signal processing unit, a data recording unit, an output memory and an image display adjustment unit which are similar to the image data receiver 86, the signal processing unit 74, the data recording unit 80 for recording and storing image data, the output memory 76, and the image display adjustment unit 78 of the camera 60 may be provided with the lens-fitted photographic film package or the ordinary camera.

Further, an lens-fitted photographic film package having a built-in IC is provided, the film package including a gate signal receiving unit for receiving a gate identification signal transmitted from a gate installed at the entrance of a theme pavilion or a theme area in place of the above image data receiving unit for receiving image data and further including a data recording unit in which image data for each gate is previously recorded.

For example, a lens-fitted photographic film package with a built-in IC, which includes a gate signal receiving unit and a data recording unit in which the image data of images dedicated for respective theme parks is recorded for respective gates is sold at the entrances and the like of theme parks. Otherwise, a service for inputting the image data of images of each gate which are dedicated for respective theme parks to a data recording unit of an ordinary camera having a gate signal receiving unit in batch processing in response to the request of customers is executed at the entrances and the like of the theme parks.

The lens-fitted photographic film package with the built-in IC arranged as described above and the ordinary camera having received the above service can determine a particular gate from which they have received a signal from a gate identification signal they have received through the gate signal receiving unit, read image data according to the thus determined gate from the data recording unit, subject the image data to image processing when necessary, and display the image of the image data on a desired image display subsection through an output memory and an image display adjustment unit.

While the image photographing/reproducing system and method, and the photographing apparatus and the image reproducing apparatus as well as the image reproducing method used in the system and the method have been described above in detail with reference to the various embodiments, the present invention is by no means limited to these embodiments, and it goes without saying that various improvements and design modifications can be made within the range which does not depart from the gist of the present invention.

As described above in detail, according to the first to fifth aspects of the present invention, composite data of images and documents of particular characters and the like can be combined with photographed images in accordance with photographed places in predetermined regions such as parks, sightseeing spots, amusement facilities, sports arenas, baseball grounds, amusement places, amusement parks, theme parks, and the like, or recorded in accordance with the predetermined regions, which can greatly improve the amusement property of the images reproduced from the images photographed by a camera such as the amusement property of photographs.

As a result, according to the first to fifth aspects of the present invention, customers can be provided with reproduced images as prints and the like the amusement property of which is improved and with the photographing apparatus such as the lens-fitted photographic film package, the camera, and the like the amusement property of which is improved.

Further, since the camera with the display screen as the photographing apparatus according to the sixth aspect of the present invention includes the image display section composed of the sheet-like image display device such as the electronic paper and the like, the camera can easily and promptly confirm an image to be photographed, an image having been photographed, and the like, and further can improve operability when various parameters, which are designated and set in photographing and the like, are input. Further, since all the possible surface of the exterior of the housing of the camera can be utilized as the display surface, the amusement property of the camera itself can be improved.

Furthermore, the camera with the display screen using the sheet-like display device such as the electronic paper and the like is less expensive as compared with a camera having a liquid crystal monitor and light in weight, and further can display a series of pictures over the back, side and front surfaces of the housing of the camera.

What is claimed is:

1. A photographing apparatus acting as a camera with a display screen for photographing an image using a photographing lens, comprising:
   an image display section disposed on the exterior of a housing and comprising a sheet-like image display device; and
   an image display adjustment unit for adjusting an image displayed on said image display section;

wherein said image display section comprises a plurality of image display surfaces disposed on a plurality of surfaces of the housing, and wherein said image display adjustment unit selects image data to be displayed on said image display section and displays at least one of a reduced image of a photographed image, an image to be photographed, an operation setting screen, and an operation explanation screen on said image display section.

2. The photographing apparatus according to claim 1, wherein:

the camera with the display screen comprises image data acquiring unit for acquiring image data; and said image display adjustment unit displays an image acquired based on the image data acquired by said image data acquiring unit on the image display section.

3. The photographing apparatus according to claim 2, wherein:

said image data acquiring unit acquires the image data previously stored in an image recording medium or a data recording unit, or receiving image data by an image data receiving unit; and said image display adjustment unit displays the image acquired based on the acquired image data on said image display section at a predetermined timing.

4. A photographing apparatus acting as a camera with a display screen for photographing an image using a photographing lens, comprising:

an image display section disposed on the exterior of a housing and comprising a sheet-like image display device;

an image display adjustment unit for adjusting an image displayed on said image display section; and an image data acquiring unit for acquiring image data, wherein said image display section comprises a plurality of image display surfaces disposed on a plurality of surfaces of the housing, said image data acquiring unit acquires the image data previously stored in an image recording medium or a data recording unit, or receiving image data by an image data receiving unit, and said image display adjustment unit displays an image acquired based on the image data acquired by said image data acquiring unit on the image display section at a predetermined timing.

* * * * *